(12) United States Patent
Karjala et al.

(10) Patent No.: US 9,303,107 B2
(45) Date of Patent: *Apr. 5, 2016

(54) ETHYLENE-BASED POLYMERS AND PROCESSES TO MAKE THE SAME

(71) Applicant: Dow Global Technologies LLC, Midland, MI (US)

(72) Inventors: Teresa P. Karjala, Lake Jackson, TX (US); Lori L. Kardos, Sugar Land, TX (US); Wallace W. Yau, Las Vegas, NV (US); Jose Ortega, Lake Jackson, TX (US); Alfred E. Vigil, Jr., Houston, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/578,654

(22) Filed: Dec. 22, 2014

(65) Prior Publication Data

US 2015/0112039 A1    Apr. 23, 2015

Related U.S. Application Data

(63) Continuation of application No. 13/799,778, filed on Mar. 13, 2013, now Pat. No. 8,916,667.

(60) Provisional application No. 61/707,342, filed on Sep. 28, 2012.

(51) Int. Cl.
  *C08F 210/02* (2006.01)
  *C08F 110/02* (2006.01)
  *C08J 5/18* (2006.01)

(52) U.S. Cl.
  CPC ............... *C08F 110/02* (2013.01); *C08J 5/18* (2013.01); *C08J 2323/06* (2013.01)

(58) Field of Classification Search
  CPC ..................... C08F 210/02; C08F 2500/26
  USPC ........................................................ 526/352
  See application file for complete search history.

(56) References Cited

U.S. PATENT DOCUMENTS

| | | | |
|---|---|---|---|
| 6,448,341 B1 | 9/2002 | Kolthammer et al. | |
| 7,741,415 B2 | 6/2010 | Conrad et al. | |
| 8,372,931 B2 | 2/2013 | Hermel-Davidock et al. | |
| 8,415,442 B2 | 4/2013 | Karjala et al. | |
| 8,822,601 B2 | 9/2014 | Karjala et al. | |
| 8,871,887 B2 * | 10/2014 | Karjala et al. | 526/352 |
| 8,916,667 B2 * | 12/2014 | Karjala et al. | 526/352.2 |
| 2008/0125553 A1 | 5/2008 | Conrad et al. | |
| 2010/0317804 A1 * | 12/2010 | Karjala et al. | 525/240 |
| 2011/0021713 A1 | 1/2011 | Demirors et al. | |
| 2012/0130019 A1 * | 5/2012 | Karjala et al. | 525/240 |
| 2013/0035444 A1 | 2/2013 | Karjala et al. | |
| 2013/0261265 A1 * | 10/2013 | Karjala et al. | 525/240 |

FOREIGN PATENT DOCUMENTS

EP    2239283 B1    1/2012

OTHER PUBLICATIONS

PCT/US2013/030787 International Search Report and Written Opinion of the International Searching Authority Mailed Oct. 14, 2013.
PCT/US2013/030787 International Preliminary Report on Patentability, Mar. 31, 2015.

* cited by examiner

*Primary Examiner* — Rip A Lee (57) ABSTRACT

An ethylene-based polymer, which is a low density polyethylene (LDPE), obtained by free radical polymerization of ethylene, and wherein the LDPE has a GPC parameter "LSP" less than 1.60.
An ethylene-based polymer that comprises the following features:
a) at least 0.1 amyl groups per 1000 total carbon atoms;
  b) a melt index of 0.01 to 0.3;
  c) a z-average molecular weight of Mz (conv.) of greater than 350,000 g/mol and less than 425,000 g/mol;
d) a gpcBR value from 1.50 to 2.05, and
e) a MWD(conv) [Mw(conv)/Mn(conv)] from 6 to 9.
An ethylene-based polymer that comprises the following features:
a) at least 0.1 amyl groups per 1000 total carbon atoms;
b) a melt viscosity ratio (V0.1/V100), at 190° C., greater than, or equal to, 58;
c) a melt viscosity at 0.1 rad/s, 190° C., greater than, or equal to, 40,000 Pa·s, and
d) a gpcBR value from 1.50 to 2.25.

12 Claims, 4 Drawing Sheets

ETHYLENE-BASED POLYMERS AND PROCESSES TO MAKE THE SAME

REFERENCE TO RELATED APPLICATIONS

This application is a continuation application of U.S. Application Ser. No. 13/799,778, filed on Mar. 13, 2013, now U.S. Pat. No. 8,916,667, which claims the benefit of U.S. Provisional Application No. 61/707,342 filed on Sep. 28, 2012.

BACKGROUND OF THE INVENTION

Blown film production lines are typically limited in output by bubble stability. Blending Linear Low Density Polyethylene (LLDPE) with 0.5 wt %-90 wt % of Low Density Polyethylene (LDPE) increases bubble stability, in part due to the higher melt strength of the LDPE. The increase in melt strength in part provides for an increase in film output. However, too high a melt strength can cause gels and poor quality film, as well as potentially limiting drawdown capabilities to thinner gauges (0.5 to 1 mil film). High melt strength resins also typically have reduced optics and toughness properties. Thus, there is a need for new ethylene-based polymers, such as LDPEs, that have an optimized balance of melt strength and improved film optical and mechanical properties, for blown film applications.

LDPE polymers are disclosed in the following references: WO 2010/042390, WO 2010/144784, WO 2011/019563, WO 2012/082393, WO 2006/049783, WO 2009/114661, US 2008/0125553, U.S. Pat. No. 7,741,415, and EP 2239283B1. However, such polymers do not provide an optimized balance of high melt strength and improved film mechanical properties, for blown film applications. Thus, as discussed above, there remains a need for new ethylene-based polymers, such as LDPEs, that have an optimized balance of melt strength, optics, processability and output, and toughness. These needs and others have been met by the following invention.

SUMMARY OF THE INVENTION

The invention provides a composition comprising an ethylene-based polymer, which is a low density polyethylene (LDPE), obtained by free radical polymerization of ethylene, and wherein the LDPE has a GPC-parameter "LSP" less than 1.60.

The invention also provides a composition comprising an ethylene-based polymer that comprises the following features:
a) at least 0.1 amyl groups per 1000 total carbon atoms;
b) a melt index of 0.01 to 0.3;
c) a z-average molecular weight of Mz (conv) of greater than 350,000 g/mol and less than 425,000 g/mol;
d) a gpcBR value from 1.50 to 2.05, and
e) a MWD(conv) [Mw(conv)/Mn(conv)] from 6 to 9.

The invention also provides a composition comprising an ethylene-based polymer that comprises the following features:
a) at least 0.1 amyl groups per 1000 total carbon atoms;
b) a melt viscosity ratio (V0.1/V100), at 190° C., greater than, or equal to, 58;
c) a melt viscosity at 0.1 rad/s, 190° C., greater than, or equal to, 40,000 Pa·s, and
d) a gpcBR value from 1.50 to 2.25.

DETAILED DESCRIPTION

Novel ethylene-based polymers, such as LDPEs, were developed with optimized melt strength to increase processability and output; allow drawability to thin gauges; minimize gels when blended with other polymers, and improve toughness relative to current LDPE products.

As discussed above, in a first aspect, the invention provides a composition comprising a low density polyethylene (LDPE) obtained by free radical polymerization of ethylene, and wherein the LDPE has a GPC-Light Scattering Parameter "LSP" less than 1.60.

The composition may comprise a combination of two or more embodiments as described herein.

The LDPE may comprise a combination of two or more embodiments as described herein.

In one embodiment, the LDPE has a GPC-Light Scattering parameter "LSP" less than 1.50, further less than 1.40, and further less than 1.35.

In one embodiment, the LDPE has a GPC-Light Scattering parameter "LSP" from 0.1. to 1.6, further from 0.3 to 1.4, and further from 0.9 to 1.2.

In one embodiment, the LDPE has at least 0.1 amyl groups per 1000 total carbon atoms.

In one embodiment, the LDPE has a gpcBR value from 1.50 to 2.25.

In one embodiment, the LDPE has a viscosity ratio (V0.1/V100, at 190° C.) greater than, or equal to, 50, further greater than, or equal to, 52.

In a second aspect, the invention provides a composition comprising an ethylene-based polymer that comprises the following features:
a) at least 0.1 amyl groups per 1000 total carbon atoms;
b) a melt index of 0.01 to 0.3;
c) a z-average molecular weight of Mz (conv) of greater than 350,000 g/mol and less than 425,000 g/mol;
d) a gpcBR value from 1.50 to 2.05, and
e) a MWD(conv) [Mw(conv)/Mn(conv)] from 6 to 9.

In a third aspect, the invention provides a composition comprising an ethylene-based polymer that comprises the following features;
a) at least 0.1 amyl groups per 1000 total carbon atoms;
b) a melt viscosity ratio (V0.1/V100), at 190° C., greater than, or equal to, 58;
c) a melt viscosity at 0.1 rad/s, 190° C., greater than, or equal to, 40,000 Pa·s, and
d) a gpcBR value from 1.50 to 2.25.

The following embodiments apply to the second and third aspects (compositions) of the invention.

The composition may comprise a combination of two or more embodiments as described herein.

The ethylene-based polymer may comprise a combination of two or more embodiments as described herein.

In one embodiment, the ethylene-based polymer has a GPC-Light Scattering parameter "LSP" less than 2.0.

In one embodiment, the polymer has a viscosity ratio (V0.1/V100, at 190° C.) greater than, or equal to, 50, further greater than, or equal to, 52.

The following embodiments apply to all three aspects (compositions) of the invention.

In one embodiment, the polymer has a MWD(conv) from 5 to 8.

In one embodiment, the polymer has a melt strength (MS) greater than 15 cN and less than 25 cN.

In one embodiment, the polymer has a melt strength of at least 15 cN and less than 21 cN, and a velocity at break of greater than 40 mm/s.

In one embodiment, the polymer has a viscosity ratio (V0.1/V100, at 190° C.) greater than, or equal to, 50, further greater than, or equal to, 55, further greater than, or equal to, 59, further greater than, or equal to, 60.

In one embodiment, the polymer has a MWD(conv) greater than 6.

In one embodiment, the polymer has a melt viscosity at 0.1 rad/s, 190° C., greater than, or equal to, 42,000 Pa·s, further greater than, or equal to, 45,000 Pa·s.

In one embodiment, the polymer has a density from 0.910 to 0.940 g/cc, further from 0.910 to 0.930 g/cc, further from 0.915 to 0.925 g/cc, and further from 0.916 to 0.922 g/cc (1 cc=1 cm$^3$).

In one embodiment, the polymer has a cc-GPC Mw from 75,000 g/mol to 175,000 g/mol, further from 100,000 to 150,000 g/mol, and further from 115,000 g/mol to 140,000 g/mol.

In one embodiment, the polymer has a cc-GPC Mz from 300,000 to 500,000 g/mol, further from 350,000 g/mol to 450,000 g/mol, and further from 375,000 g/mol to 425,000 g/mol.

In one embodiment, the polymer has a Mw-abs from 200,000 g/mol to 350,000 g/mol, further from 225,000 g/mol to 325,000 g/mol, and further from 250,000 g/mol to 300,000 g/mol.

In one embodiment, the polymer has a Mw(LS-abs)/Mw (cc-GPC) from 1 to 3, further from 1.5 to 2.75, and further from 1.9 to 2.4.

In one embodiment, the polymer has an IVw from 1.00 dl/g to 1.30 dl/g, further from 1.05 dl/g to 1.25 dl/g, and further from 1.1 dl/g to 1.2 dl/g.

In one embodiment, the polymer has an IVcc from 1.4 dl/g to 2.5 dl/g, further from 1.6 to 2.25 dl/g, and further from 1.7-2.1 dl/g.

In one embodiment, the polymer has an IVcc/IVw from 1.2 to 2.2, further from 1.4 to 1.9, and further from 1.6 to 1.7.

In one embodiment, the polymer has greater than, or equal to, 0.2 amyl groups (branches) per 1000 carbon atoms, further greater than, or equal to, 0.5 amyl groups per 1000 carbon atoms, further greater than, or equal to, 1 amyl groups per 1000 carbon atoms, and further greater than, or equal to, 1.4 amyl groups per 1000 carbon atoms.

In one embodiment, the polymer has a rheology ratio (V0.1/V100), at 190° C., from 40 to 80, further from 45 to 70, and further from 50 to 65.

In one embodiment, the polymer has a tan delta (measured at 0.1 rad/s at 190° C.) less than, or equal to 2.0, further less than, or equal to 1.75, and further than, or equal to 1.50.

In one embodiment, the polymer has a tan delta (measured at 0.1 rad/s) from 0.5 to 2, further from 0.75 to 1.75, and further from 1 to 1.5.

In one embodiment, the polymer has a viscosity at 0.1 rad/s and 190° C. from 30,000 Pa·s to 80,000 Pa·s, further from 40,000 Pa·s to 70,000 Pa·s, and further from 45,000 Pa·s to 60,000 Pa·s.

In one embodiment, the polymer is formed in a high pressure (P greater than 100 MPa) polymerization process.

In one embodiment, the polymer is a low density polyethylene (LDPE), obtained by the high pressure (P greater than 100 MPa), free radical polymerization of ethylene.

In one embodiment, the polymer is a low density polyethylene (LDPE).

In one embodiment, the polymer is present at greater than, or equal to, 10 weight percent, based on the weight of the composition.

In one embodiment, the polymer is present in an amount from 10 to 50 weight percent, further from 20 to 40 weight percent, based on the weight of the composition.

In one embodiment, the polymer is present in an amount from 60 to 90 weight percent, further from 65 to 85 weight percent, based on the weight of the composition.

In one embodiment, the polymer is present in an amount from 1 to 10 weight percent, further from 1.5 to 5 weight percent, based on the weight of the composition.

In one embodiment, the composition further comprises another ethylene-based polymer. Suitable other ethylene-based polymers include, but are not limited to, DOWLEX Polyethylene Resins, TUFLIN Linear Low Density Polyethylene Resins, ELITE or ELITE AT Enhanced Polyethylene Resins (all available from The Dow Chemical Company), high density polyethylenes (d≥0.96 g/cc), medium density polyethylenes (density from 0.935 to 0.955 g/cc), EXCEED polymers and ENABLE polymers (both from ExxonMobil), LDPE, and EVA (ethylene vinyl acetate).

In one embodiment, the composition further comprises another ethylene-based polymer that differs in one or more properties, such as density, melt index, comonomer, comonomer content, etc., from the inventive polymer. Suitable other ethylene-based polymers include, but are not limited to, DOWLEX Polyethylene Resins (LLDPEs), TUFLIN Linear Low Density Polyethylene Resins, ELITE or ELITE AT Enhanced Polyethylene Resins (all available from The Dow Chemical Company), high density polyethylenes (d≥0.96 g/cc), medium density polyethylenes (density from 0.935 to 0.955 g/cc), EXCEED polymers and ENABLE polymers (both from ExxonMobil), LDPE, and EVA (ethylene vinyl acetate).

In one embodiment, the composition further comprises a propylene-based polymer. Suitable propylene-based polymers include polypropylene homopolymers, propylene/α-olefin interpolymers, and propylene/ethylene interpolymers.

In one embodiment, the composition further comprises a heterogeneously branched ethylene/α-olefin interpolymer, and preferably a heterogeneously branched ethylene/α-olefin copolymer. In one embodiment, the heterogeneously branched ethylene/α-olefin interpolymer, and preferably a heterogeneously branched ethylene/α-olefin copolymer, has a density from 0.89 to 0.94 g/cc, further from 0.90 to 0.93 g/cc. In a further embodiment, the composition comprises 1 to 99 weight percent, further from 15 to 85 weight percent, of the inventive ethylene-based polymer, based on the weight of the composition.

In one embodiment, the composition comprises less than 5 ppm, further less than 2 ppm, further less than 1 ppm, and further less than 0.5 ppm sulfur, based on the weight of the composition.

In one embodiment, the composition does not contain sulfur.

In one embodiment, the composition comprises from 1.5 to 80 weight percent of an inventive polymer. In a further embodiment, the composition further comprises a LLDPE (Linear Low Density Polyethylene).

In one embodiment, the composition comprises from 1.5 to 20 weight percent an inventive polymer. In a further embodiment, the composition further comprises a LLDPE.

In one embodiment, the composition comprises from 20 to 80 weight percent, further from 50 to 80 weight percent an inventive polymer. In a further embodiment, the composition further comprises a LLDPE.

An inventive composition may comprise a combination of two or more embodiments as described herein.

In one embodiment, for the first and third aspects, the polymer has a melt index (I2) from 0.01 to 10 g/10 min, further from 0.05 to 5 g/10 min, and further from 0.05 to 0.5 g/10 min.

In one embodiment, for the first and third aspects, the polymer has a melt index (I2) from 0.01 to 1.5 g/10 min, further from 0.05 to 1.0 g/10 min, and further from 0.05 to 0.25 g/10 min In one embodiment, for the first and third aspects, the polymer has a melt index (I2) from 0.01 to 1 g/10 min In one embodiment, for the first and third aspects, the polymer has a melt index (I2) less than or equal to 0.5.

In one embodiment, for the first and third aspects, the polymer has a rheology ratio (V0.1/V100), at 190° C., greater than, or equal to 40, further greater than, or equal to 45, further greater than, or equal to 50, and further greater than, or equal to 55.

The invention also provides an article comprising at least one component formed from an inventive composition. In a further embodiment, the article is a film. In another embodiment, the article is a coating.

The invention also provides a process for forming an inventive ethylene-based polymer of any of the previous embodiments, the process comprising polymerizing ethylene, and optionally at least one comonomer, in at least one autoclave reactor.

The invention also provides a process for forming a polymer of any of the previous embodiments, the process comprising polymerizing ethylene, and optionally at least one comonomer, in at least one tubular reactor.

The invention also provides a process for forming an inventive ethylene-based polymer of any of the previous embodiments, the process comprising polymerizing ethylene, and optionally at least one comonomer, in a combination of at least one tubular reactor and at least one autoclave reactor.

An inventive composition may comprise a combination of two or more embodiments as described herein.

An inventive ethylene-based polymer may comprise a combination of two or more embodiments as described herein.

An inventive article may comprise a combination of two or more embodiments as described herein. An inventive film may comprise a combination of two or more embodiments as described herein.

An inventive process may comprise a combination of two or more embodiments as described herein.

Process

For producing an inventive ethylene-based polymer, including an inventive LDPE, a high pressure, free-radical initiated polymerization process is typically used. Two different high pressure, free-radical initiated polymerization process types are known. In the first type, an agitated autoclave vessel having one or more reaction zones is used. The autoclave reactor normally has several injection points for initiator or monomer feeds, or both. In the second type, a jacketed tube is used as a reactor, which has one or more reaction zones. Suitable, but not limiting, reactor lengths may be from 100 to 3000 meters (m), or from 1000 to 2000 meters. The beginning of a reaction zone for either type of reactor is typically defined by the side injection of either initiator of the reaction, ethylene, chain transfer agent (or telomer), comonomer(s), as well as any combination thereof. A high pressure process can be carried out in autoclave or tubular reactors, each having one or more reaction zones, or in a combination of autoclave and tubular reactors, each comprising one or more reaction zones.

A chain transfer agent can be used to control molecular weight. In a preferred embodiment, one or more chain transfer agents (CTAs) are added to an inventive polymerization process. Typical CTA's that can be used include, but are not limited to, propylene, isobutane, n-butane, 1-butene, methyl ethyl ketone, acetone, and propionaldehyde. In one embodiment, the amount of CTA used in the process is from 0.03 to 10 weight percent of the total reaction mixture.

Ethylene used for the production of the ethylene-based polymer may be purified ethylene, which is obtained by removing polar components from a loop recycle stream, or by using a reaction system configuration, such that only fresh ethylene is used for making the inventive polymer. It is not typical that only purified ethylene is required to make the ethylene-based polymer. In such cases ethylene from the recycle loop may be used.

In one embodiment, the ethylene-based polymer is a polyethylene homopolymer.

In another embodiment, the ethylene-based polymer comprises ethylene and one or more comonomers, and preferably one comonomer. Comonomers include, but are not limited to, α-olefin comonomers, typically having no more than 20 carbon atoms. For example, the α-olefin comonomers may have 3 to 10 carbon atoms, further 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. In the alternative, exemplary comonomers include, but are not limited to α,β-unsaturated C3-C8-carboxylic acids (for example, maleic acid, fumaric acid, itaconic acid, acrylic acid, methacrylic acid), crotonic acid derivatives of the α,β-unsaturated C3-C8-carboxylic acids (for example, unsaturated C3-C15-carboxylic acid esters, in particular ester of C1-C6-alkanols, or anhydrides), methyl methacrylate, ethyl methacrylate, n-butyl methacrylate, ter-butyl methacrylate, methyl acrylate, ethyl acrylate, n-butyl acrylate, 2-ethylhexyl acrylate, tert-butyl acrylate, methacrylic anhydride, maleic anhydride, and itaconic anhydride. In another alternative, the exemplary comonomers include, but are not limited to, vinyl carboxylates, for example vinyl acetate. In another alternative, exemplary comonomers include, but are not limited to, n-butyl acrylate, acrylic acid and methacrylic acid.

Additives

An inventive composition may comprise one or more additives. Additives include, but are not limited to, stabilizers, plasticizers, antistatic agents, pigments, dyes, nucleating agents, fillers, slip agents, fire retardants, processing aids, smoke inhibitors, viscosity control agents and anti-blocking agents. The polymer composition may, for example, comprise less than 10 percent (by the combined weight) of one or more additives, based on the weight of the inventive polymer composition.

In one embodiment, the polymers of this invention are treated with one or more stabilizers, for example, antioxidants, such as IRGANOX 1010, IRGANOX 1076 and IRGAFOS 168 (Ciba Specialty Chemicals; Glattbrugg, Switzerland). In general, the polymers are treated with one or more stabilizers before extrusion or other melt processes. Processing aids, such as plasticizers, include, but are not limited to, the phthalates, such as dioctyl phthalate and diisobutyl phthalate, natural oils such as lanolin, and paraffin, naphthenic and aromatic oils obtained from petroleum refining, and liquid resins from rosin or petroleum feedstocks. Exemplary classes of oils, useful as processing aids, include white mineral oil such as KAYDOL oil (Chemtura Corp.; Middlebury, Conn.) and SHELLFLEX 371 naphthenic oil (Shell Lubricants; Houston, Tex.). One other suitable oil is TUFFLO oil (Lyondell Lubricants; Houston, Tex.).

Blends and mixtures of the inventive polymer with other polymers may be performed. Suitable polymers for blending with the inventive polymer include natural and synthetic polymers. Exemplary polymers for blending include propylene-based polymers (both impact modifying polypropylene, isotactic polypropylene, atactic polypropylene, and random ethylene/propylene copolymers), various types of ethylene-based polymers, including high pressure, free-radical LDPE, LLDPE prepared with Ziegler-Natta catalysts, PE prepared with single site catalysts, including multiple reactor PE ("in reactor" blends of Ziegler-Natta PE and single site catalyzed PE, such as products disclosed in U.S. Pat. No. 6,545,088 (Kolthammer et al.); U.S. Pat. No. 6,538,070 (Cardwell, et al.); U.S. Pat. No. 6,566,446 (Parikh, et al.); U.S. Pat. No. 5,844,045 (Kolthammer et al.); U.S. Pat. No. 5,869,575 (Kolthammer et al.); and U.S. Pat. No. 6,448,341 (Kolthammer et al.)), EVA, ethylene/vinyl alcohol copolymers, polystyrene, impact modified polystyrene, ABS, styrene/butadiene block copolymers and hydrogenated derivatives thereof (SBS and SEBS), and thermoplastic polyurethanes. Homogeneous polymers, such as olefin plastomers and elastomers, ethylene and propylene-based copolymers (for example, polymers available under the trade designation VERSIFY Plastomers & Elastomers (The Dow Chemical Company) and VISTAMAXX (ExxonMobil Chemical Co.) can also be useful as components in blends comprising the inventive polymer).

Applications

The polymers of this invention may be employed in a variety of conventional thermoplastic fabrication processes to produce useful articles, including, but not limited to, monolayer and multilayer films; molded articles, such as blow molded, injection molded, or rotomolded articles; coatings; fibers; and woven or non-woven fabrics.

An inventive polymer may be used in a variety of films, including but not limited to, extrusion coating, food packaging, consumer, industrial, agricultural (applications or films), lamination films, fresh cut produce films, meat films, cheese films, candy films, clarity shrink films, collation shrink films, stretch films, silage films, greenhouse films, fumigation films, liner films, stretch hood, heavy duty shipping sacks, pet food, sandwich bags, sealants, and diaper backsheets.

An inventive polymer is also useful in other direct end-use applications. An inventive polymer may be used for wire and cable coating operations, in sheet extrusion for vacuum forming operations, and forming molded articles, including the use of injection molding, blow molding process, or rotomolding processes.

Other suitable applications for the inventive polymers include elastic films and fibers; soft touch goods, such as appliance handles; gaskets and profiles; auto interior parts and profiles; foam goods (both open and closed cell); impact modifiers for other thermoplastic polymers, such as high density polyethylene, or other olefin polymers; cap liners; and flooring.

Definitions

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities may be incorporated into and/or within a polymer.

The term "interpolymer," as used herein, refers to polymers prepared by the polymerization of at least two different types of monomers. The generic term interpolymer includes copolymers (employed to refer to polymers prepared from two different types of monomers), and polymers prepared from more than two different types of monomers.

The term "ethylene-based polymer," as used herein, refers to a polymer that comprises a majority amount of polymerized ethylene monomer (based on weight of the polymer) and, optionally, may contain at least one comonomer.

The term "ethylene/$\alpha$-olefin interpolymer," as used herein, refers to an interpolymer that comprises a majority amount of polymerized ethylene monomer (based on the weight of the interpolymer) and at least one $\alpha$-olefin.

The term, "ethylene/$\alpha$-olefin copolymer," as used herein, refers to a copolymer that comprises a majority amount of polymerized ethylene monomer (based on the weight of the copolymer), and an $\alpha$-olefin, as the only two monomer types.

The term "propylene-based polymer," as used herein, refers to a polymer that comprises a majority amount of polymerized propylene monomer (based on weight of the polymer) and, optionally, may comprise at least one comonomer.

The term "composition," as used herein, includes a mixture of materials which comprise the composition, as well as reaction products and decomposition products formed from the materials of the composition.

The terms "blend" or "polymer blend," as used, refers to a mixture of two or more polymers. A blend may or may not be miscible (not phase separated at the molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Density

Samples for density measurements were prepared according to ASTM D 4703-10. Samples were pressed at 374° F. (190° C.) for five minutes at 10,000 psi (68 MPa). The temperature was maintained at 374° F. (190° C.) for the above five minutes, and then the pressure was increased to 30,000 psi (207 MPa) for three minutes. This was followed by a one minute hold at 70° F. (21° C.) and 30,000 psi (207 MPa). Measurements were made within one hour of sample pressing using ASTM D792-08, Method B.

Melt Index

Melt index, or I2, was measured in accordance with ASTM D 1238-10, Condition 190° C./2.16 kg, Method A, and was reported in grams eluted per 10 minutes.

Nuclear Magnetic Resonance ($^{13}$C NMR)

Samples were prepared by adding approximately "3 g of a 50/50 mixture of tetrachloroethane-d2/orthodichlorobenzene, containing 0.025 M Cr(AcAc)$_3$," to a "0.25 to 0.40 g polymer sample," in a 10 mm NMR tube. Oxygen was removed from the sample by placing the open tubes in a nitrogen environment for at least 45 minutes. The samples were then dissolved and homogenized by heating the tube, and its contents to 150° C., using a heating block and heat gun. Each dissolved sample was visually inspected to ensure homogeneity. Samples were thoroughly mixed, immediately prior to analysis, and were not allowed to cool before insertion into the heated NMR sample holders.

All data were collected using a Bruker 400 MHz spectrometer. The data was acquired using a six second pulse repetition delay, 90-degree flip angles, and inverse gated decoupling, with a sample temperature of 125° C. All measurements were made on non-spinning samples in locked mode. Samples were allowed to thermally equilibrate for seven minutes prior to data acquisition. The $^{13}$C NMR chemical shifts were internally referenced to the EEE triad at 30.0 ppm. The C6+ value was a direct measure of C6+ branches in LDPE, where the long branches were not distinguished from chain ends. The 32.2 ppm peak, representing the third carbon from the end of all chains or branches of six or more carbons, was used to determine the C6+ value.

Nuclear Magnetic Resonance ($^1$H NMR)

Sample Preparation

The samples were prepared by adding approximately 130 mg of sample to "3.25 g of 50/50, by weight, tetrachlorethane-d2/perchloroethylene" with 0.001 M Cr(AcAc)$_3$ in a NORELL 1001-7, 10 mm NMR tube. The samples were purged by bubbling N$_2$ through the solvent, via a pipette inserted into the tube, for approximately five minutes, to prevent oxidation. Each tube was capped, sealed with TEFLON tape, and then soaked at room temperature, overnight, to facilitate sample dissolution. The samples were kept in a N$_2$ purge box, during storage, before, and after, preparation, to minimize exposure to O$_2$. The samples were heated and vortexed at 115° C. to ensure homogeneity.

Data Acquisition Parameters

The $^1$H NMR was performed on a Bruker AVANCE 400 MHz spectrometer, equipped with a Bruker Dual DUL high-temperature CryoProbe, and a sample temperature of 120° C. Two experiments were run to obtain spectra, a control spectrum to quantitate the total polymer protons, and a double presaturation experiment, which suppressed the intense polymer backbone peaks, and enabled high sensitivity spectra for quantitation of the end-groups. The control was run with ZG pulse, 4 scans, SWH 10,000 Hz, AQ 1.64 s, D1 14 s. The double presaturation experiment was run with a modified pulse sequence, TD 32768, 100 scans, DS 4, SWH 10,000 Hz, AQ 1.64 s, D1 1 s, D13 13 s.

Data Analysis—$^1$H NMR Calculations

The signal from residual $^1$H in TCE-d2 (at 6.0 ppm) was integrated, and set to a value of 100, and the integral from 3 to −0.5 ppm was used as the signal from the whole polymer in the control experiment. For the presaturation experiment, the TCE signal was also set to 100, and the corresponding integrals for unsaturation (vinylene at about 5.40 to 5.60 ppm, trisubstituted at about 5.16 to 5.35 ppm, vinyl at about 4.95 to 5.15 ppm, and vinylidene at about 4.70 to 4.90 ppm) were obtained.

In the presaturation experiment spectrum, the regions for cis- and trans-vinylene, trisubstituted, vinyl, and vinylidene were integrated. The integral of the whole polymer from the control experiment was divided by two, to obtain a value representing X thousands of carbons (i.e., if the polymer integral=28,000, this represents 14,000 carbons, and X=14).

The unsaturated group integrals, divided by the corresponding number of protons contributing to that integral, represent the moles of each type of unsaturation per X thousand carbons. Dividing the moles of each type of unsaturation by X, then gives moles unsaturated groups per 1,000 moles of carbons.

Melt Strength

Melt strength measurements were conducted on a Gottfert Rheotens 71.97 (Göettfert Inc.; Rock Hill, S.C.), attached to a Gottfert Rheotester 2000 capillary rheometer. The melted sample (about 25 to 30 grams) was fed with a Göettfert Rheotester 2000 capillary rheometer, equipped with a flat entrance angle (180 degrees) of length of 30 mm, diameter of 2.0 mm, and an aspect ratio (length/diameter) of 15. After equilibrating the samples at 190° C. for 10 minutes, the piston was run at a constant piston speed of 0.265 mm/second. The standard test temperature was 190° C. The sample was drawn uniaxially to a set of accelerating nips, located 100 mm below the die, with an acceleration of 2.4 mm/s$^2$. The tensile force was recorded as a function of the take-up speed of the nip rolls. Melt strength was reported as the plateau force (cN) before the strand broke. The following conditions were used in the melt strength measurements: plunger speed=0.265 mm/second; wheel acceleration=2.4 mm/s$^2$; capillary diameter=2.0 mm; capillary length=30 mm; and barrel diameter=12 mm.

Dynamic Mechanical Spectroscopy (DMS)

Resins were compression-molded into "3 mm thick×1 inch" circular plaques at 350° F., for five minutes, under 1500 psi pressure, in air. The sample was then taken out of the press, and placed on the counter to cool.

A constant temperature frequency sweep was performed using a TA Instruments "Advanced Rheometric Expansion System (ARES)," equipped with 25 mm (diameter) parallel plates, under a nitrogen purge. The sample was placed on the plate, and allowed to melt for five minutes at 190° C. The plates were then closed to a gap of 2 mm, the sample trimmed (extra sample that extends beyond the circumference of the "25 mm diameter" plate was removed), and then the test was started. The method had an additional five minute delay built in, to allow for temperature equilibrium. The experiments were performed at 190° C., over a frequency range of 0.1 to 100 rad/s. The strain amplitude was constant at 10%. The complex viscosity η*, tan (δ) or tan delta, viscosity at 0.1 rad/s (V0.1), the viscosity at 100 rad/s (V100), and the viscosity ratio (V0.1/V100) were calculated from these data.

Triple Detector Gel Permeation Chromatography (TDGPC)—Conventional GPC, Light Scattering GPC, Viscometry GPC and gpcBR For the GPC techniques used herein (Conventional GPC, Light Scattering GPC, Viscometry GPC and gpcBR), a Triple Detector Gel Permeation Chromatography (3D-GPC or TDGPC) system was used. This system consists of a Robotic Assistant Delivery (RAD) high temperature GPC system [other suitable high temperature GPC instruments include Waters (Milford, Mass.) model 150C High Temperature Chromatograph; Polymer Laboratories (Shropshire, UK) Model 210 and Model 220; and Polymer Char GPC-IR (Valencia, Spain)], equipped with a Precision Detectors (Amherst, Mass.) 2-angle laser light scattering (LS) detector Model 2040, an IR4 infra-red detector from Polymer ChAR (Valencia, Spain), and a 4-capillary solution viscometer (DP) (other suitable viscometers include Viscotek (Houston, Tex.) 150R 4-capillary solution viscometer (DP)).

A GPC with these latter two independent detectors and at least one of the former detectors is sometimes referred to as "3D-GPC" or "TDGPC," while the term "GPC" alone generally refers to conventional GPC. Data collection is performed using Polymer Char GPC-IR software (Valencia, Spain). The system is also equipped with an on-line solvent degassing device from Polymer Laboratories (Shropshire, United Kingdom).

The eluent from the GPC column set flows through each detector arranged in series, in the following order: LS detector, IR4 detector, then DP detector. The systematic approach for the determination of multi-detector offsets is performed in a manner consistent with that published by Balke, Mourey, et al. (Mourey and Balke, Chromatography Polym., Chapter 12, (1992)) (Balke, Thitiratsakul, Lew, Cheung, Mourey, Chromatography Polym., Chapter 13, (1992)). The triple detector log (MW and intrinsic viscosity) results were optimized using a broad polyethylene standard, as outlined in the section on Light Scattering (LS) GPC below, in the paragraph following Equation (5).

Suitable high temperature GPC columns can be used, such as four, 30 cm, long Shodex HT803 13 micron columns, or four, 30 cm, Polymer Labs columns of 13-micron mixed-pore-size packing (Olexis LS, Polymer Labs). Here, the Olexis LS columns were used. The sample carousel compartment is operated at 140° C., and the column compartment is operated at 150° C. The samples are prepared at a concentration of "0.1 grams of polymer in 50 milliliters of solvent." The chromatographic solvent and the sample preparation solvent is 1,2,4-trichlorobenzene (TCB) containing 200 ppm of 2,6-di-tert-butyl-4methylphenol (BHT). The solvent is sparged with nitrogen. The polymer samples are gently stirred at 160° C. for four hours. The injection volume is 200 microliters. The flow rate through the GPC is set at 1 ml/minute.

Conventional GPC

For Conventional GPC, the IR4 detector is used, and the GPC column set is calibrated by running 21 narrow molecular weight distribution polystyrene standards. The molecular weight (MW) of the standards ranges from 580 g/mol to 8,400,000 g/mol, and the standards are contained in six "cocktail" mixtures. Each standard mixture has at least a decade of separation between individual molecular weights. The standard mixtures are purchased from Polymer Laboratories. The polystyrene standards are prepared at "0.025 g in 50 mL of solvent" for molecular weights equal to, or greater than, 1,000,000 g/mol, and at "0.05 g in 50 mL of solvent" for molecular weights less than 1,000,000 g/mol. The polystyrene standards are dissolved at 80° C., with gentle agitation, for 30 minutes. The narrow standards mixtures are run first, and in order of decreasing "highest molecular weight component" to minimize degradation. The polystyrene standard peak molecular weights are converted to polyethylene molecular weight using Equation (1) (as described in Williams and Ward, J. Polym. Sci., Polym. Letters, 6, 621 (1968)):

$$M_{polyethylene} = A \times (M_{polystyrene})^B \quad \text{(Eq. 1)},$$

where M is the molecular weight of polyethylene or polystyrene (as marked), and B is equal to 1.0. It is known to those of ordinary skill in the art that A may be in a range of about 0.38 to about 0.44, and is determined at the time of calibration, using a broad polyethylene standard, as outlined in the section on Light Scattering (LS) GPC, below in the paragraph following Equation (5). Use of this polyethylene calibration method to obtain molecular weight values, such as the molecular weight distribution (MWD or Mw/Mn), and related statistics, is defined here as the modified method of Williams and Ward. The number average molecular weight, the weight average molecular weight, and the z-average molecular weight are calculated from the following equations.

$$M_{w_{CC}} = \sum_i \left(\frac{C_i}{\sum_i C_i}\right) M_i = \sum_i w_i M_{cc,i}; \quad \text{(Eq. 2)}$$

$$M_{n,cc} = \sum w_i / \sum (w_i / M_{cc,i}); \quad \text{(Eq. 3)}$$

$$M_{z,cc} = \sum (w_i M_{cc,i}^2) / \sum (w_i / M_{cc,i}). \quad \text{(Eq. 4)}$$

Light Scattering (LS) GPC

For the LS GPC, the Precision Detector PDI2040 detector Model 2040 is used. Depending on the sample, either the 15° angle or the 90° angle of the light scattering detector is used for calculation purposes. Here, the 15° angle was used.

The molecular weight data is obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The overall injected concentration used in the determination of the molecular weight is obtained from the mass detector area, and the mass detector constant derived from a suitable linear polyethylene homopolymer, or one of the polyethylene standards of known weight average molecular weight. The calculated molecular weights are obtained using a light scattering constant derived from one or more of the polyethylene standards, mentioned below, and a refractive index concentration coefficient, dn/dc, of 0.104. Generally, the mass detector response and the light scattering constant should be determined from a linear standard with a molecular weight in excess of about 50,000 g/mole. The viscometer calibration can be accomplished using the methods described by the manufacturer, or, alternatively, by using the published values of suitable linear standards, such as Standard Reference Materials (SRM) 1475a (available from National Institute of Standards and Technology (NIST)). The chromatographic concentrations are assumed low enough to eliminate addressing 2nd viral coefficient effects (concentration effects on molecular weight).

With 3D-GPC, absolute weight average molecular weight ("Mw, Abs") is determined using Equation (5) below, using the "peak area" method for higher accuracy and precision. The "LS Area" and the "Conc. Area" are generated by the chromatograph/detectors combination.

$$M_W = \sum_i w_i M_i \quad \text{(Eq. 5)}$$

$$= \sum_i \left(\frac{C_i}{\sum_i C_i}\right) M_i$$

$$= \frac{\sum_i C_i M_i}{\sum_i C_i}$$

$$= \frac{\sum_i LS_i}{\sum_i C_i}$$

$$= \frac{LS \text{ Area}}{\text{Conc. Area}}$$

Figure 1:
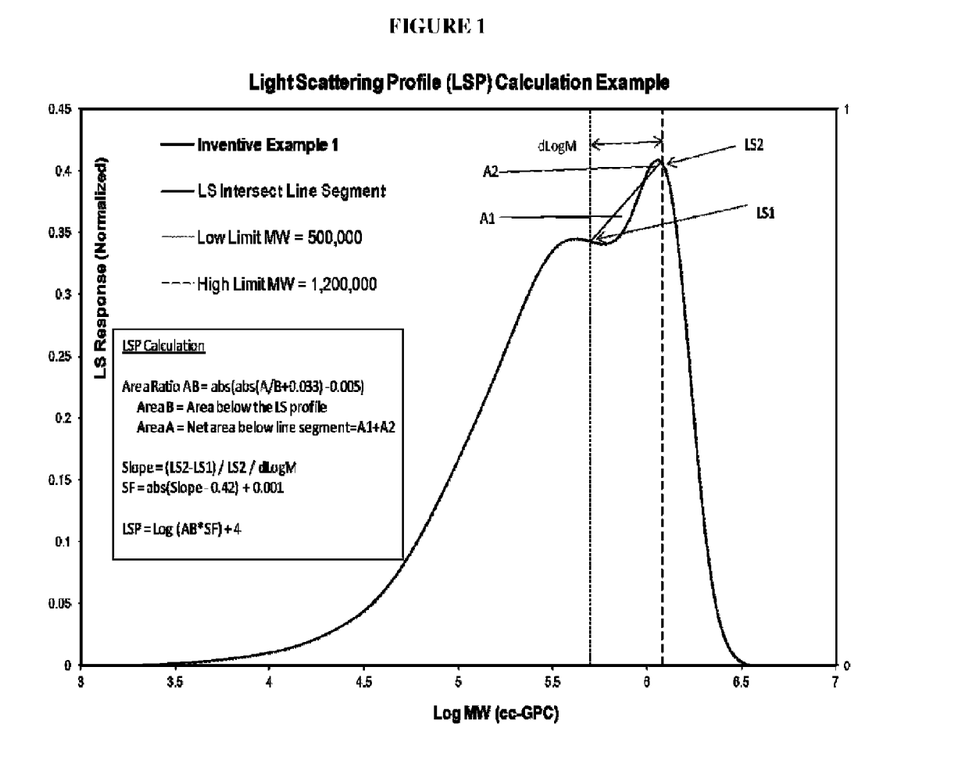
FIG. 1 depicts a GPC LS (light scattering) profile of Example 1.
Figure 2:
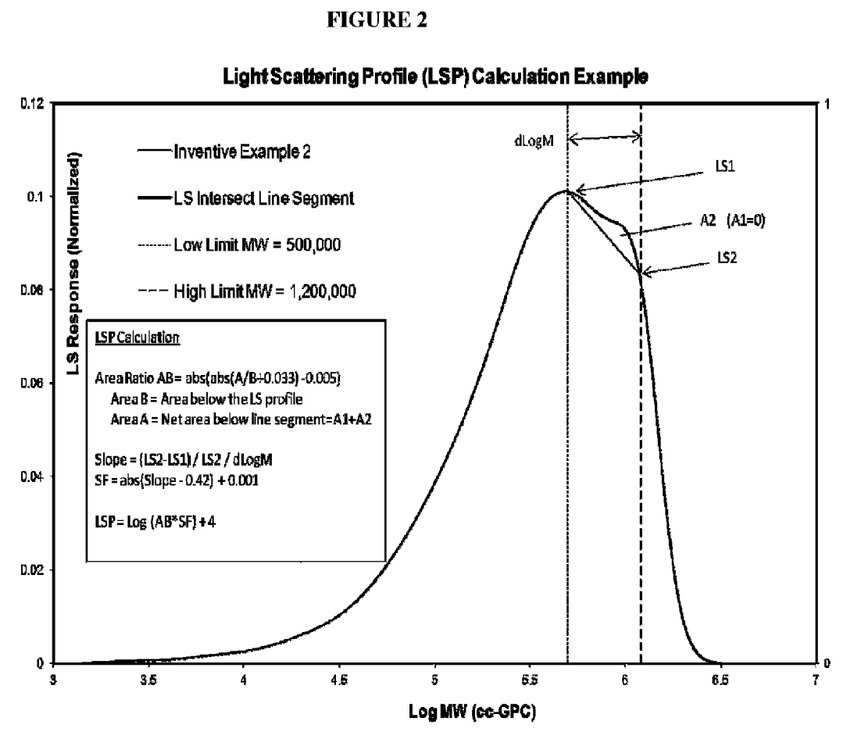
FIG. 2 depicts a GPC LS (light scattering) profile of Example 2.
Figure 3:
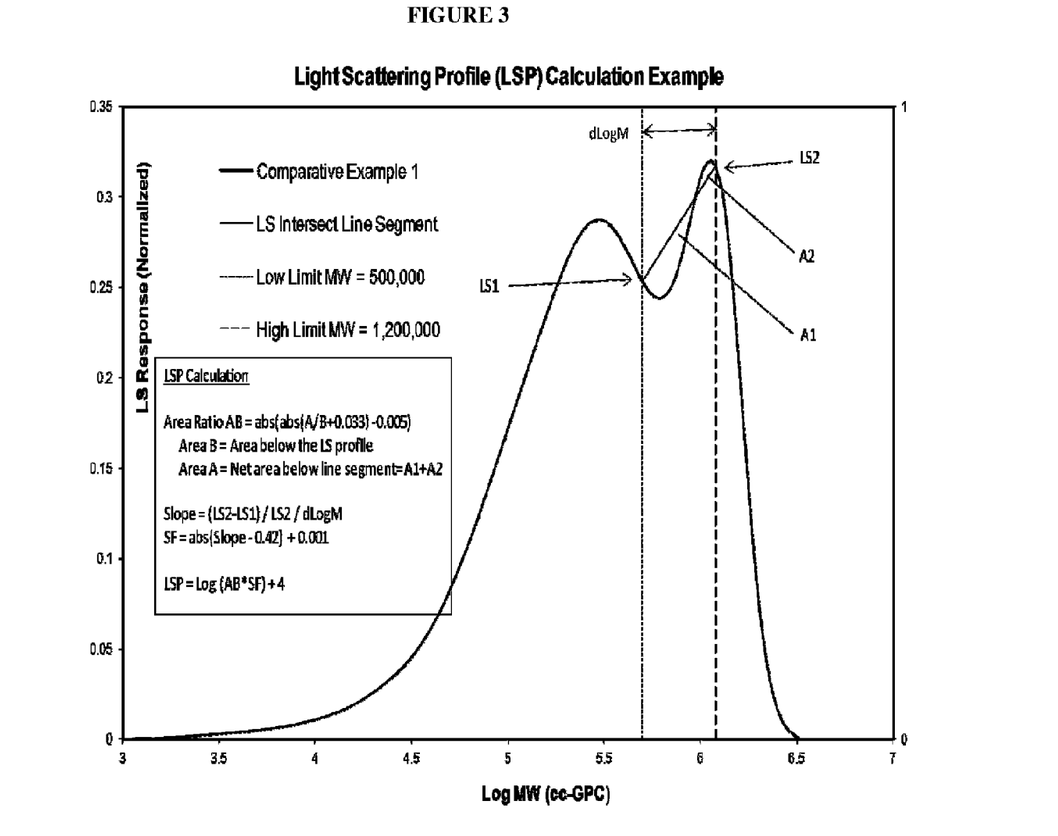
FIG. 3 depicts a GPC LS (light scattering) profile of Comparative Example 1.

For each LS and viscometry DP profile (for example, see FIGS. 1, 2, and 3) the x-axis (log MWcc-CPC), where cc refers to the conventional calibration curve, is determined as follows. First, the polystyrene standards (see above) are used to calibrate the retention volume into "log $MW_{PS}$." Then, Equation 1 (Mpolyethylene=A×(Mpolystyrene)$^B$) is used to convert "log $MW_{PS}$" to "log $MW_{PE}$." The "log $MW_{PE}$" scale serves as the x-axis for the LS profiles of the experimental section (log $MW_{PE}$ is equated to the log MW(cc-CPC)). The y-axis for each LS or DP profile is the LS or DP detector response normalized by the injected sample mass. In FIGS. 1, 2 and 3, the y-axis for each viscometer DP profile is the DP detector response normalized by the injected sample mass. Initially, the molecular weight and intrinsic viscosity for a linear polyethylene standard sample, such as SRM1475a or an equivalent, are determined using the conventional calibrations ("cc") for both molecular weight and intrinsic viscosity as a function of elution volume.

gpcBR Branching Index by Triple Detector GPC (3D-GPC)

The gpcBR branching index is determined by first calibrating the light scattering, viscosity, and concentration detectors as described previously. Baselines are then subtracted from the light scattering, viscometer, and concentration chromatograms. Integration windows are then set to ensure integration of all of the low molecular weight retention volume range in the light scattering and viscometer chromatograms that indicate the presence of detectable polymer from the refractive index chromatogram. Linear polyethylene standards are then used to establish polyethylene and polystyrene Mark-Houwink constants. Upon obtaining the constants, the two values are used to construct two linear reference conventional calibrations for polyethylene molecular weight and polyethylene intrinsic viscosity as a function of elution volume, as shown in Equations (6) and (7):

$$M_{PE} = \left(\frac{K_{PS}}{K_{PE}}\right)^{1/a_{PE}+1} \cdot M_{PS}^{a_{PS}+1/a_{PE}+1}, \quad \text{(Eq. 6)}$$

$$[\eta]_{PE} = K_{PS} \cdot M_{PS}^{a+1} / M_{PE}. \quad \text{(Eq. 7)}$$

The gpcBR branching index is a robust method for the characterization of long chain branching as described in Yau, Wallace W., "Examples of Using 3D-GPC—TREF for Polyolefin Characterization," Macromol. Symp., 2007, 257, 29-45. The index avoids the "slice-by-slice" 3D-GPC calculations traditionally used in the determination of g' values and branching frequency calculations, in favor of whole polymer detector areas. From 3D-GPC data, one can obtain the sample bulk absolute weight average molecular weight (Mw, Abs) by the light scattering (LS) detector, using the peak area method. The method avoids the "slice-by-slice" ratio of light scattering detector signal over the concentration detector signal, as required in a traditional g' determination.

With 3D-GPC, sample intrinsic viscosities are also obtained independently using Equations (8). The area calculation in Equation (5) and (8) offers more precision, because, as an overall sample area, it is much less sensitive to variation caused by detector noise and 3D-GPC settings on baseline and integration limits. More importantly, the peak area calculation is not affected by the detector volume offsets. Similarly, the high-precision, sample intrinsic viscosity (IV) is obtained by the area method shown in Equation (8):

$$IV = [\eta] \quad \text{(Eq. 8)}$$
$$= \sum_i w_i IV_i$$
$$= \sum_i \left(\frac{C_i}{\sum_i C_i}\right) IV_i$$
$$= \frac{\sum_i C_i IV_i}{\sum_i C_i}$$
$$= \frac{\sum_i DP_i}{\sum_i C_i}$$
$$= \frac{DP \text{ Area}}{\text{Conc. Area}},$$

where DPi stands for the differential pressure signal monitored directly from the online viscometer.

To determine the gpcBR branching index, the light scattering elution area for the sample polymer is used to determine the molecular weight of the sample. The viscosity detector elution area for the sample polymer is used to determine the intrinsic viscosity (IV or [η]) of the sample.

Initially, the molecular weight and intrinsic viscosity for a linear polyethylene standard sample, such as SRM1475a or an equivalent, are determined using the conventional calibrations ("cc") for both molecular weight and intrinsic viscosity as a function of elution volume, per Equations (2) and (9):

$$[\eta]_{CC} = \sum_i \left(\frac{C_i}{\sum_i C_i}\right) IV_i = \sum_i w_i IV_{cc,i}. \quad \text{(Eq. 9)}$$

Equation (10) is used to determine the gpcBR branching index:

$$gpcBR = \left[\left(\frac{[\eta]_{CC}}{[\eta]}\right) \cdot \left(\frac{M_W}{M_{W,CC}}\right)^{a_{PE}} - 1\right], \quad \text{(Eq. 10)}$$

wherein [η] is the measured intrinsic viscosity, $[\eta]_{cc}$ is the intrinsic viscosity from the conventional calibration, Mw is the measured weight average molecular weight, and $M_{w,cc}$ is the weight average molecular weight of the conventional calibration. The weight average molecular weight by light scattering (LS) using Equation (5) is commonly referred to as "absolute weight average molecular weight" or "$M_w$, Abs." The $M_{w,cc}$ from Equation (2) using conventional GPC molecular weight calibration curve ("conventional calibration") is often referred to as "polymer chain backbone molecular weight," "conventional weight average molecular weight," and "$M_{w,GPC}$."

All statistical values with the "cc" subscript are determined using their respective elution volumes, the corresponding conventional calibration as previously described, and the concentration (Ci). The non-subscripted values are measured values based on the mass detector, LALLS, and viscometer areas. The value of $K_{PE}$ is adjusted iteratively, until the linear reference sample has a gpcBR measured value of zero. For example, the final values for α and Log K for the determination of gpcBR in this particular case are 0.725 and −3.355, respectively, for polyethylene, and 0.722 and −3.993, respectively, for polystyrene.

Once the K and α values have been determined using the procedure discussed previously, the procedure is repeated using the branched samples. The branched samples are analyzed using the final Mark-Houwink constants as the best "cc" calibration values, and Equations (2)-(9) are applied.

The interpretation of gpcBR is straight forward. For linear polymers, gpcBR calculated from Equation (8) will be close to zero, since the values measured by LS and viscometry will be close to the conventional calibration standard. For branched polymers, gpcBR will be higher than zero, especially with high levels of long chain branching, because the measured polymer molecular weight will be higher than the calculated $M_{w,cc}$, and the calculated $IV_{cc}$ will be higher than the measured polymer IV. In fact, the gpcBR value represents the fractional IV change due to the molecular size contraction effect as a result of polymer branching. A gpcBR value of 0.5 or 2.0 would mean a molecular size contraction effect of IV at the level of 50% and 200%, respectively, versus a linear polymer molecule of equivalent weight.

For these particular examples, the advantage of using gpcBR, in comparison to a traditional "g' index" and branching frequency calculations, is due to the higher precision of gpcBR. All of the parameters used in the gpcBR index determination are obtained with good precision, and are not detrimentally affected by the low 3D-GPC detector response at high molecular weight from the concentration detector. Errors in detector volume alignment also do not affect the precision of the gpcBR index determination.

Representative Calculation of LS Profile "LSP"—Inventive and Comparative

A GPC elution profile of the concentration-normalized LS detector response is shown in FIGS. 1 and 2 for Inventive Examples 1 and 2, and FIG. 3 for Comparative Example 1, respectively. The quantities that affect the "LSP" value are defined with the aid of these Figures. The x-axis in the plots is the logarithmic value of the molecular weight (MW) by conventional GPC calculation, or cc-GPC MW. The y-axis is the LS detector response normalized for equal sample concentration, as measured by the peak area of the concentration detector (not shown). The specific features of the LS elution profile are captured in a window defined by two log-MW limits shown in the FIGS. 1 and 2. The lower limit corresponds to a M1 value of 200,000 g/mol, and the upper limit corresponds to a M2 value of 1,200,000 g/mol.

The vertical lines of these two MW limits intersect with the LS elution curve at two points. A line segment is drawn connecting these two intercept points. The height of the LS signal at the first intercept (log M1) gives the S1 quantity. The height of the LS signal at the second intercept (log M2) gives the S2 quantity. The area under the LS elution curve within the two MW limits gives the quantity Area B. Comparing the LS curve with the line segment connecting the two intercepts, there can be part of the segregated area that is above the line segment (see A2 in the Figures, defined as a negative value) or below the line segment (like A1 in the Figures, defined as a positive value). The sum of A1 and A2 gives the quantity Area A, the total area of A. This total area A can be calculated as the difference between the Area B and the area below the line segment. The validity of this approach can be proven by the following two equations (note that A2 is negative as shown in the FIGS. 1 and 2). Since, (Area below line segment)=(Area B)+A2+A1=(Area B)+(Area A), therefore, (Area A)=(Area B)−(Area below line segment).

The steps of calculating the "LSP" quantity are illustrated with three examples (Inventive Examples 1 and 2, and Comparative Example 1) shown in Table 1 and Table 2.

Step 1, calculate "SlopeF" in Table 1, using following two equations:

$$\text{slope\_value}=[(LS2-LS1)/LS2]/d\,\text{Log}\,M \quad \text{(Eq. 11)}$$

$$\text{SlopeF} = \text{a slope function} = \text{Abs}(\text{slope\_value}-0.42)+0.001 \quad \text{(Eq. 12)}$$

Step 2, calculate "AreaF" and "LSF" in Table 2, using following two equations:

$$\text{AreaF} = \text{an area function} = \text{Abs}(\text{Abs}(A/B+0.033)-0.005) \quad \text{(Eq. 13)}$$

where, A/B=(Area A)/(Area B)

$$\text{LSP} = \text{Log}(\text{AreaF}*\text{SlopeF})+4 \quad \text{(Eq. 14)}$$

TABLE 1

The "SlopeF" Calculation

| Sample | LS1 | M1 = 200,000 g/mol Log M1 | LS2 | M2 = 1,200,000 g/mol Log M2 | dLog M | Slope Value | Abs(slope − 0.42) + 0.001 SlopeF |
|---|---|---|---|---|---|---|---|
| Ex. 1 | 0.34 | 5.699 | 0.41 | 6.079 | 0.380 | 0.418 | 0.003 |
| Ex. 2 | 0.10 | 5.699 | 0.08 | 6.079 | 0.380 | −0.57 | 0.989 |
| CE 1 | 0.25 | 5.699 | 0.32 | 6.079 | 0.380 | 0.529 | 0.110 |

TABLE 2

The "AreaF" and "LSP" Calculation

| Sample | LS curve Area B | Line segment Area (A + B) | A/B | Abs(Abs(A/B + 0.033) − 0.005) = AreaF | Log(AreaF *SlopeF) + 4 = LSP |
|---|---|---|---|---|---|
| Ex. 1 | 24.801 | 25.76 | 0.039 | 0.0667 | 0.36 |
| Ex. 2 | 6.791 | 6.54 | −0.037 | 0.0012 | 1.07 |
| CE 1 | 18.549 | 19.61 | 0.057 | 0.0851 | 1.97 |

Differential Scanning Calorimetry (DSC)

Differential Scanning Calorimetry (DSC) can be used to measure the melting and crystallization behavior of a polymer over a wide range of temperatures. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (~25° C.). The film sample was formed by pressing a "0.1 to 0.2 gram" sample at 175° C. at 1,500 psi and 30 seconds, to form a "0.1 to 0.2 mil thick" film. A 3-10 mg, six mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C., and held isothermal for five minutes, in order to remove its thermal history. Next, the sample is cooled to −40° C., at a 10° C./minute cooling rate, and held isothermal at −40° C. for five minutes. The sample is then heated to 150° C. (this is the "second heat" ramp) at a 10° C./minute heating rate. The cooling and second heating curves are recorded. The cooling curve is analyzed by setting baseline endpoints from the beginning of crystallization to −20° C. The heating curve is analyzed by setting baseline endpoints from −20° C. to the end of melt. The values determined are peak melting temperature ($T_m$), peak crystallization temperature ($T_c$), heat of fusion ($H_f$) (in Joules per gram), and the calculated % crystallinity for polyethylene samples using:

$$\% \text{ Crystallinity} = ((H_f)/(292 \text{ J/g})) \times 100 \quad \text{(Eq. 15)}.$$

The heat of fusion and the peak melting temperature are reported from the second heat curve. The peak crystallization temperature is determined from the cooling curve.

Film Testing

The following physical properties were measured on the films as described in the experimental section.

Total (Overall) Haze and Internal Haze: Internal haze and total haze were measured according to ASTM D 1003-07. Internal haze was obtained via refractive index matching using mineral oil (1-2 teaspoons), which was applied as a coating on each surface of the film. A Hazegard Plus (BYK-Gardner USA; Columbia, Md.) was used for testing. For each test, five samples were examined, and an average reported. Sample dimensions were "6 in×6 in."

45° Gloss: ASTM D2457-08 (average of five film samples; each sample "10 in×10 in").

Clarity: ASTM D1746-09 (average of five film samples; each sample "10 in×10 in").

2% Secant Modulus—MD (machine direction) and CD (cross direction): ASTM D882-10 (average of five film samples in each direction; each sample "1 in×6 in").

MD and CD Elmendorf Tear Strength: ASTM D1922-09 (average of 15 film samples in each direction; each sample "3 in×2.5 in" half moon shape).

MD and CD Tensile Strength: ASTM D882-10 (average of five film samples in each direction; each sample "1 in×6 in").

Dart Impact Strength: ASTM D1709-09 (minimum of 20 drops to achieve a 50% failure; typically ten "10 in×36 in" strips).

Puncture Strength: Puncture was measured on an INSTRON Model 4201 with SINTECH TESTWORKS SOFTWARE Version 3.10. The specimen size was "6 in×6 in," and four measurements were made to determine an average puncture value. The film was conditioned for 40 hours after film production, and at least 24 hours in an ASTM controlled laboratory (23° C. and 50% relative humidity). A "100 lb" load cell was used with a round specimen holder of 4 inch diameter. The puncture probe was a "½ inch diameter" polished stainless steel ball (on a 2.5" rod) with a "7.5 inch maximum travel length."

There was no gauge length, and the probe was as close as possible to, but not touching, the specimen. The probe was set by raising the probe until it touched the specimen. Then the probe was gradually lowered, until it was not touching the specimen. Then the crosshead was set at zero. Considering the maximum travel distance, the distance would be approximately 0.10 inch. The crosshead speed was 10 inches/minute. The thickness was measured in the middle of the specimen. The thickness of the film, the distance the crosshead traveled, and the peak load were used to determine the puncture by the software. The puncture probe was cleaned using a "KIM-WIPE" after each specimen.

Shrink Tension: Shrink tension was measured according to the method described in Y. Jin, T. Hermel-Davidock, T. Karjala, M. Demirors, J. Wang, E. Leyva, and D. Allen, "Shrink Force Measurement of Low Shrink Force Films", SPE ANTEC Proceedings, p. 1264 (2008). The shrink tension of film samples was measured through a temperature ramp test that was conducted on an RSA-III Dynamic Mechanical Analyzer (TA Instruments; New Castle, Del.) with a film fixture. Film specimens of "12.7 mm wide" and "63.5 mm long" were die cut from the film sample, either in the machine direction (MD) or the cross direction (CD), for testing. The film thickness was measured by a Mitutoyo Absolute digimatic indicator (Model C112CEXB). This indicator had a maximum measurement range of 12.7 mm, with a resolution of 0.001 mm. The average of three thickness measurements, at different locations on each film specimen, and the width of the specimen, were used to calculate the film's cross sectional area (A), in which "A=Width×Thickness" of the film specimen that was used in shrink film testing.

A standard film tension fixture from TA Instruments was used for the measurement. The oven of the RSA-III was equilibrated at 25° C., for at least 30 minutes, prior to zeroing the gap and the axial force. The initial gap was set to 20 mm. The film specimen was then attached onto both the upper and the lower fixtures. Typically, measurements for MD only require one ply film. Because the shrink tension in the CD direction is typically low, two or four plies of films are stacked together for each measurement to improve the signal-to-noise ratio. In such a case, the film thickness is the sum of all of the plies. In this work, a single ply was used in the MD direction and two plies were used in the CD direction. After the film reached the initial temperature of 25° C., the upper fixture was manually raised or lowered slightly to obtain an axial force of −1.0 g. This was to ensure that no buckling or excessive stretching of the film occurred at the beginning of the test. Then the test was started. A constant fixture gap was maintained during the entire measurement.

The temperature ramp started at a rate of 90° C./min, from 25° C. to 80° C., followed by a rate of 20° C./min, from 80° C. to 160° C. During the ramp from 80° C. to 160° C., as the film shrunk, the shrink force, measured by the force transducer, was recorded as a function of temperature for further analysis. The difference between the "peak force" and the "baseline value before the onset of the shrink force peak" is considered the shrink force (F) of the film. The shrink tension of the film is the ratio of the shrink force (F) to the initial cross sectional area (A) of the film.

EXPERIMENTAL

Preparation of Inventive Ethylene-Based Polymers

Figure 4:
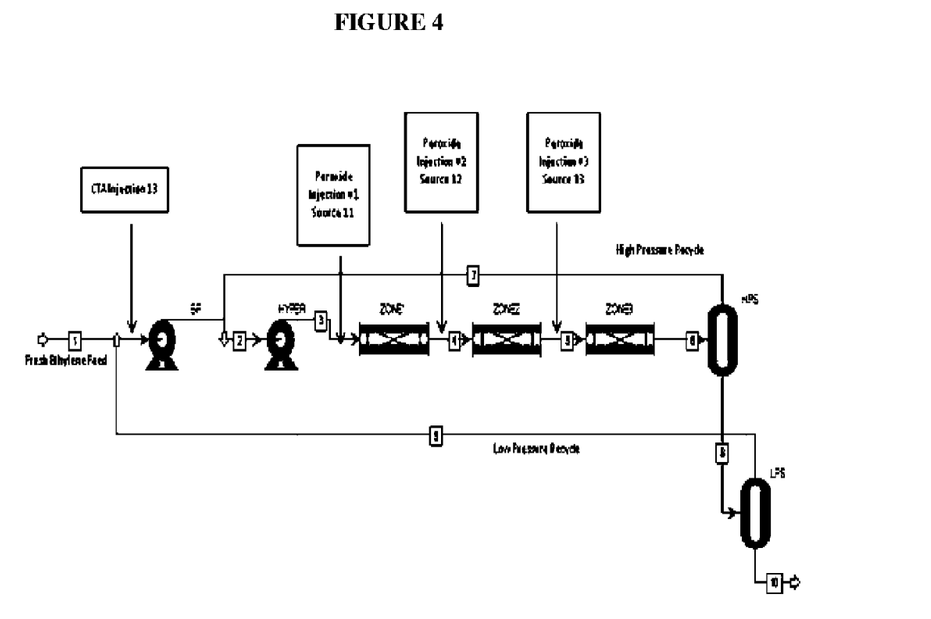
FIG. 4 depicts a block diagram of the process reaction system used to produce the Inventive Examples.

FIG. 4 is a block diagram of the process reaction system used to produce the examples. The process reaction system in FIG. 4 is a partially closed-loop, dual recycle, high-pressure, low density polyethylene production system. The process reaction system is comprised of a fresh ethylene feed line [1], a booster/primary compressor "BP," a hypercompressor "Hyper," and a three zone tube. The tube reactor consists of a first reaction feed zone; a first peroxide initiator line [3] connected to a first peroxide initiator source [11]; a second peroxide initiator line [4] connected to the second peroxide initiator source 12; and a third peroxide initiator line [5] connected to a third peroxide initiator source 13. Cooling jackets (using high pressure water) are mounted around the outer shell of the tube reactor and preheater. The tube reactor further consists of a high pressure separator "HPS," a high pressure recycle line [7], a low pressure separator "LPS," a low pressure recycle line [9], and a chain transfer agent (CTA) feed system 13.

The tube reactor further comprises three reaction zones demarcated by the location of peroxide injection points. The first reaction zone feed is attached to the front of the tube reactor, and feeds a portion of the process fluid into the first reaction zone. The first reaction zone starts at injection point #1 [3], and ends at injection point #2 [4]. The first peroxide initiator is connected to the tube reactor at injection point #1 [3]. The second reaction zone starts at injection point #2 [4]. The second reaction zone ends at injection point #3 [5]. The third reaction zone starts at injection point #3 [5]. For all the examples, 100 percent of the ethylene and ethylene recycles are directed to the first reaction zone, via the first reaction zone feed conduit [1]. This is referred to as an all front gas tubular reactor.

For Inventive Example 1 and Comparative Example 1, a mixture containing t-butyl peroxy-2 ethylhexanoate (TBPO), di-t-butyl peroxide (DTBP), tert-butyl peroxypivalate (PIV), and an iso-paraffinic hydrocarbon solvent (boiling range 171-191° C.; for example, ISOPAR H) are used as the initiator mixture for the first injection point. For injection points #2 and #3, a mixture containing only DTBP, TBPO, and the iso-paraffinic hydrocarbon solvent are used.

For Inventive Example 4, a mixture containing t-butyl peroxy-2-ethylhexanoate (TBPO), di-t-butyl peroxide (DTBP), tert-butyl peroxyneodecanoate (PND), and an iso-paraffinic hydrocarbon solvent (boiling range 171-191° C.; for example, ISOPAR H) are used as the initiator mixture for the first injection point. For injection points #2 and #3, a mixture containing only DTBP, TBPO, and the iso-paraffinic hydrocarbon solvent are used. The reactor tube process conditions are given in Tables 3, 4 and 5.

Propylene was used as the CTA. The propylene was injected into the ethylene stream at the discharge drum of the first stage booster. The concentration of the CTA feed to the process was adjusted to control the melt index of the product.

For Inventive Examples 1 and 4, it was discovered that these pressures and temperatures produced a LDPE fractional melt index resin with a broad molecular weight distribution (MWD). Table 5 shows that the reactor pressure was lowered and the reactor peak temperatures were raised for the Inventive Examples when compared to the Comparative Example. This was done to maximize the molecular weight distribution of the product. The molecular weight of the examples was also maximized by reducing the recycle CTA (propylene) concentration fed to the reactor. These process conditions, along with other disclosed process conditions, result in resins with the inventive properties described herein.

Properties of inventive LDPEs and comparative LDPEs are listed in Tables 6-11. Table 6 contains the melt index (I2), density, melt strength, and the velocity at break of the melt strength data. The inventive polymers exhibit a good melt strength, but not as high as some of the comparative examples, and provide a good balance of bubble stability in combination with low gels in the final film, which is often formed from a blend of a LDPE with another material such as LLDPE. If the melt strength is too high, there is a higher propensity to form gels, and also the resin when used in film applications may not be able to be drawn down to thin thicknesses.

Table 6 also contains the conventional TDGPC data, illustrating for the inventive examples the relatively broad molecular weight distribution or MWD or cc-GPC Mw/Mn, and relatively high z-average molecular weight, Mz or cc-GPC Mz. Table 7 contains the TDGPC-related properties derived from the LS and viscosity detectors, in conjunction with the concentration detector, showing that the inventive examples have an intermediate Mw-abs, Mw(LS-abs)/Mw (cc-GPC), and gpcBR, and a low LSP, reflective of the relatively broad molecular weight distribution, coupled with a relatively high level of long chain branching, as reflected by a high gpcBR. This design is optimized to give an optimum melt strength, in order to give a good balance of physical properties, along with good drawability, bubble stability, output, and processability, when forming films or coatings with an inventive LDPE or blends with this LDPE.

Table 8 contains the DMS viscosity data, as summarized by the viscosities measured at 0.1, 1, 10, and 100 rad/s, the viscosity ratio or the ratio of viscosity measured at 0.1 rad/s to the viscosity measured at 100 rad/s, all being measured at 190° C., and the tan delta measured at 0.1 rad/s. The low frequency viscosity, the viscosity at 0.1 rad/s, is relatively high for the Inventive Examples as compared to the Comparative Examples. A high "low frequency viscosity" may be correlated with good melt strength, bubble stability, and film output. The viscosity ratio, which reflects the change in viscosity with frequency, is high for the Inventive Examples as compared to the Comparative Examples. This is reflective of potentially good processability of the Inventive Examples when making blown film. The tan delta at 0.1 rad/s is relatively low, indicative of high melt elasticity, which may also be correlated with good blown film bubble stability.

Table 9 contains the branches per 1000C as measured by $^{13}$C NMR. These LDPE polymers contain amyl, or C5 branches, which are not contained in substantially linear polyethylenes, such as AFFINITY Polyolefin Plastomers, or the LLDPEs, such as DOWLEX Polyethylene Resins, both produced by The Dow Chemical Company. Each inventive and comparative LDPE, shown in Table 9, contains greater than, or equal to, 0.5 amyl groups (branches) per 1000 carbon atoms (the Inventive Examples contain greater than 1 amyl groups (branches) per 1000 carbon atoms).

Table 10 contains unsaturation results by $^1$H NMR. Table 11 contains the DSC results of the melting point, $T_m$, the heat of fusion, the percent crystallinity, and the crystallization point, $T_c$.

TABLE 3

Peroxide initiator flows in pounds per hour at each injection point used for manufacture of Examples 2-5.

| Injection Point | Initiator | Example 2 Neat PO lbs/hour | Example 3 Neat PO lbs/hour | Example 4 Neat PO lbs/hour | Example 5 Neat PO lbs/hour |
|---|---|---|---|---|---|
| #1 | TBPO | 3.6 | 3.8 | 3.9 | 3.6 |
| #1 | DTBP | 2.6 | 2.5 | 2.4 | 2.4 |
| #1 | PND | 0.58 | 0.60 | 0.55 | 0.60 |
| #2 | TBPO | 0.95 | 0.96 | 0.91 | 0.90 |
| #2 | DTBP | 4.1 | 4.0 | 4.1 | 4.1 |
| #3 | TBPO | 0.66 | 0.65 | 0.65 | 0.65 |
| #3 | DTBP | 1.3 | 1.4 | 1.3 | 1.3 |

TABLE 4

Peroxide initiator flows in pounds per hour at each injection point used for manufacture of Example 1 and Comparative Example 1.

| Injection Point | Initiator | Example 1 (kg/hr) | Comparative Example 1 (kg/hr) |
|---|---|---|---|
| #1 | TBPO | 3.32 | 2.67 |
| #1 | DTBP | 0.86 | 0.69 |
| #1 | PIV | 0.74 | 0.59 |
| #1 | Solvent | 19.70 | 15.83 |
| #2 | TBPO | 0.24 | 0.21 |
| #2 | DTBP | 0.73 | 0.63 |
| #2 | Solvent | 11.23 | 9.71 |
| #3 | TBPO | 0.30 | 0.22 |
| #3 | DTBP | 0.90 | 0.65 |
| #3 | Solvent | 13.73 | 9.98 |

TABLE 5

Process conditions used to manufacture Inventive Examples 1-5 and Comparative Example 1.

| Process Variables | Ex. 1 | Ex. 2 | Ex. 3 | Ex. 4 | Ex. 5 | Comp. Ex. 1 |
|---|---|---|---|---|---|---|
| Reactor Pressure (Psig) | 35,000 | 36,000 | 36,000 | 36,000 | 36,000 | 38,000 |
| Zone 1 Initiation T (° C.) | 132 | 154 | 154 | 154 | 154 | 134 |
| Zone 1 Peak T (° C.) | 302 | 305 | 305 | 305 | 305 | 298 |
| Zone 2 Initiation T (° C.) | 251 | 225 | 225 | 224 | 224 | 246 |
| Zone 2 Peak T (° C.) | 302 | 305 | 305 | 305 | 305 | 298 |
| Zone 3 Initiation T (° C.) | 255 | 248 | 247 | 247 | 248 | 246 |
| Zone 3 Peak T (° C.) | 299 | 285 | 285 | 285 | 285 | 292 |
| Fresh ethylene Flow (lb/hr) | 24,901 | 29,500 | 29,500 | 29,500 | 29,500 | 24,160 |
| Ethylene Throughput to Reactor (lb/hr) | 101,000 | 100,000 | 100,000 | 100,000 | 100,000 | 101,000 |
| Ethylene Conversion (%) | 23 | 28 | 28 | 28 | 28 | 23.6 |
| Polyethylene Production Rate (lb/hr) | 23,202 | 28,000 | 28,000 | 28,000 | 28,000 | 23,800 |
| Propylene Flow (lb/hr) | 134 | 268 | 266 | 266 | 260 | 233 |
| Ethylene Purge Flow (lb/hr) | 488 | 1,500 | 1,500 | 1,500 | 1,500 | 490 |
| Recycle Prop Conc. (% Vol) | 0.33 | 0.63 | 0.63 | 0.63 | 0.63 | 0.83 |
| Pre-heater T (° C.) | 206 | 190 | 190 | 190 | 190 | 206 |
| Reactor Cooling System 1 (° C.) | 183 | 140 | 140 | 140 | 140 | 183 |
| Reactor Cooling System 2 (° C.) | 183 | N/A | N/A | N/A | N/A | 183 |

TABLE 6

Melt Index (I2), Density, Melt Strength (MS) and Velocity at Break at 190° C. and TDGPC-related properties (conventional calibration) of Examples and Comparative Examples.

| Sample | $I_2$ (190° C.) | Density (g/cc) | Melt strength (cN) | Velocity at break (mm/s) | cc-GPC Mn (g/mol) | cc-GPC Mw (g/mol) | cc-GPC Mz (g/mol) | cc-GPC Mw/Mn |
|---|---|---|---|---|---|---|---|---|
| Ex. 1 | 0.15 | 0.9195 | 17.0 | 65.0 | 18,287 | 121,843 | 395,621 | 6.66 |
| Ex. 2 | 0.15 | 0.9183 | 18.6 | 62.7 | 18,726 | 130,231 | 387,249 | 6.95 |
| Ex. 3 | 0.15 | 0.9183 | 18.3 | 52.9 | 18,605 | 130,532 | 392,440 | 6.96 |
| Ex. 4 | 0.15 | 0.9184 | 17.8 | 54.7 | 18,725 | 130,255 | 384,698 | 6.96 |
| Ex. 5 | 0.15 | 0.9185 | 19.1 | 59.9 | 18,736 | 131,327 | 392,865 | 7.01 |
| CE 1 | 0.25 | 0.9228 | 15.0 | 102.0 | 20,332 | 106,549 | 334,953 | 5.24 |
| CE 2 | 0.17 | 0.9184 | 19.5 | 54.0 | 19,835 | 141,700 | 451,854 | 7.18 |
| CE 3 | 0.38 | 0.9182 | 30.0 | 72.0 | 24,050 | 255,596 | 901,799 | 10.63 |
| CE 4 | 0.64 | 0.9205 | 12.1 | 162.0 | 15,463 | 101,916 | 330,862 | 6.59 |
| CE 5 | 0.44 | 0.9244 | 11.5 | 172.0 | 20,044 | 87,096 | 262,188 | 4.35 |
| CE 6 | 0.37 | 0.9276 | 12.6 | 116.0 | 20,432 | 90,529 | 261,099 | 4.43 |
| CE 7 | 0.24 | 0.9215 | 15.1 | 53.0 | 18,327 | 108,779 | 344,274 | 5.94 |
| CE 8 | 0.49 | 0.9274 | 11.8 | 91.0 | 20,111 | 102,166 | 345,225 | 5.08 |
| CE 9 | 0.63 | 0.9262 | 11.6 | 133.0 | 18,194 | 98,424 | 340,388 | 5.41 |
| CE 10 | 0.70 | 0.9269 | 11.6 | 153.0 | 18,703 | 100,434 | 350,396 | 5.37 |
| CE 11 | 0.23 | 0.9189 | 21.8 | 54.0 | 19,504 | 129,761 | 405,912 | 6.65 |
| CE 12 | 0.26 | 0.9179 | 25.8 | 47.0 | 18,406 | 141,179 | 451,348 | 7.67 |
| CE 13 | 0.26 | 0.9251 | 18.6 | 74.0 | 22,343 | 106,907 | 267,377 | 4.78 |
| CE 14 | 0.85 | 0.9240 | 13.1 | 237.0 | 17,895 | 93,157 | 293,489 | 5.21 |
| CE 15 | 0.17 | 0.9225 | 16.6 | 62.0 | 19,379 | 114,951 | 385,618 | 5.93 |
| CE 16 | 0.61 | 0.9269 | 13.4 | 124.0 | 17,287 | 101,768 | 333,400 | 5.89 |
| CE 17 | 1.08 | 0.924 | 10.2 | 335 | 20,412 | 84,867 | 192,476 | 4.16 |
| CE 18 | 0.82 | 0.923 | 16.5 | 273 | 20,224 | 98,856 | 253,926 | 4.89 |
| CE 19 | 0.25 | 0.9200 | 17.4 | 78 | 17,199 | 114,533 | 376,769 | 6.66 |
| CE 20 | 0.90 | 0.9328 | 6.5 | 274 | 24,463 | 65,652 | 135,683 | 2.68 |
| CE 21 | 0.15 | 0.9200 | 19.37 | 53.3 | 17,160 | 125,170 | 319,287 | 7.29 |
| CE 22 | 0.39 | 0.9190 | 16.21 | 74 | 12,727 | 112,867 | 304,980 | 9.31 |
| CE 23 | 0.28 | 0.9278 | 15.6 | 70 | 18,431 | 109,716 | 354,514 | 5.95 |
| CE 24 | 0.73 | 0.9236 | 16.18 | 183 | 22,545 | 105,649 | 274,411 | 4.69 |

TABLE 6-continued

Melt Index (I2), Density, Melt Strength (MS) and Velocity at Break at 190° C. and TDGPC-related properties (conventional calibration) of Examples and Comparative Examples.

| Sample | I₂ (190° C.) | Density (g/cc) | Melt strength (cN) | Velocity at break (mm/s) | cc-GPC Mn (g/mol) | cc-GPC Mw (g/mol) | cc-GPC Mz (g/mol) | cc-GPC Mw/Mn |
|---|---|---|---|---|---|---|---|---|
| CE 25 | 0.70 | 0.9235 | 10.76 | 132.2 | 18,535 | 86,468 | 280,330 | 4.67 |
| CE 26 | 2.12 | 0.9178 | 16.5 | 228.8 | 18,491 | 169,817 | 631,298 | 9.18 |

TABLE 7

TDGPC-related properties (derived from LS and viscosity detectors in conjunction with the concentration detector).

| Sample | Mw-abs (g/mol) | Mw (LS-abs)/ Mw (cc-GPC) | IVw (dl/g) | gpcBR | IVcc (dl/g) | IVcc/IVw | LSP = Log LSCDF + 4 |
|---|---|---|---|---|---|---|---|
| Ex. 1 | 268,302 | 2.20 | 1.13 | 1.80 | 1.85 | 1.65 | 0.36 |
| Ex. 2 | 273,105 | 2.10 | 1.16 | 1.91 | 1.95 | 1.68 | 1.07 |
| Ex. 3 | 276,207 | 2.12 | 1.16 | 1.96 | 1.95 | 1.68 | 1.05 |
| Ex. 4 | 276,601 | 2.12 | 1.16 | 1.96 | 1.95 | 1.68 | 1.30 |
| Ex. 5 | 281,716 | 2.15 | 1.17 | 1.98 | 1.96 | 1.68 | 0.71 |
| CE 1 | 225,633 | 2.12 | 1.08 | 1.61 | 1.70 | 1.58 | 1.97 |
| CE 2 | 336,652 | 2.34 | 1.19 | 2.30 | 2.08 | 1.75 | 1.75 |
| CE 3 | 951,706 | 3.72 | 1.27 | 5.27 | 3.04 | 2.38 | 2.88 |
| CE 4 | 211,371 | 2.07 | 1.00 | 1.79 | 1.63 | 1.63 | 2.10 |
| CE 5 | 164,284 | 1.89 | 1.01 | 1.36 | 1.49 | 1.48 | 2.33 |
| CE 6 | 184,461 | 2.04 | 1.02 | 1.57 | 1.54 | 1.50 | 2.49 |
| CE 7 | 225,070 | 2.07 | 1.08 | 1.73 | 1.72 | 1.59 | 2.04 |
| CE 8 | 180,442 | 1.77 | 1.06 | 1.35 | 1.63 | 1.54 | 2.79 |
| CE 9 | 181,596 | 1.85 | 1.02 | 1.44 | 1.58 | 1.55 | 2.76 |
| CE 10 | 190,569 | 1.90 | 1.03 | 1.48 | 1.60 | 1.56 | 2.80 |
| CE 11 | 290,561 | 2.24 | 1.14 | 2.10 | 1.94 | 1.71 | 2.06 |
| CE 12 | 316,844 | 2.24 | 1.15 | 2.22 | 2.05 | 1.78 | 1.69 |
| CE 13 | 184,786 | 1.73 | 1.10 | 1.39 | 1.74 | 1.59 | 3.67 |
| CE 14 | 195,785 | 2.10 | 0.98 | 1.72 | 1.55 | 1.58 | 1.78 |
| CE 15 | 257,569 | 2.24 | 1.11 | 1.90 | 1.78 | 1.60 | 2.08 |
| CE 16 | 182,589 | 1.79 | 1.02 | 1.46 | 1.63 | 1.61 | 2.91 |
| CE 17 | 124,474 | 1.47 | 0.96 | 1.07 | 1.49 | 1.55 | 4.63 |
| CE 18 | 154,163 | 1.56 | 1.00 | 1.29 | 1.64 | 1.63 | 4.33 |
| CE 19 | 266,655 | 2.33 | 1.07 | 2.11 | 1.77 | 1.66 | 1.75 |
| CE 20 | 97,247 | 1.48 | 0.97 | 0.72 | 1.27 | 1.31 | 4.22 |
| CE 21 | 278,963 | 2.23 | 1.18 | 1.96 | 1.93 | 1.64 | 4.23 |
| CE 22 | 275,647 | 2.33 | 1.08 | 2.20 | 1.81 | 1.68 | 4.25 |
| CE 23 | 208,452 | 1.90 | 1.08 | 1.55 | 1.72 | 1.60 | 3.14 |
| CE 24 | 199,066 | 1.88 | 1.04 | 1.65 | 1.72 | 1.66 | 3.43 |
| CE 25 | 148,996 | 1.72 | 1.00 | 1.18 | 1.46 | 1.46 | 2.41 |
| CE 26 | 514,477 | 3.03 | 1.05 | 3.79 | 2.26 | 2.14 | 2.54 |

TABLE 8

Viscosities in Pa · s at 0.1, 1, 10, and 100 rad/s, the viscosity ratio, and the tan delta at 190° C.

| Sample | Visc 0.1 rad/s | Visc 1 rad/s | Visc 10 rad/s | Visc 100 rad/s | Vis. Ratio V0.1/V100 | Tan Delta 0.1 rad/s |
|---|---|---|---|---|---|---|
| Ex. 1 | 47,750 | 15,519 | 3,989 | 882 | 54.1 | 1.3 |
| Ex. 2 | 50,932 | 15,532 | 3,865 | 830 | 61.4 | 1.2 |
| Ex. 3 | 52,171 | 16,046 | 4,002 | 861 | 60.6 | 1.2 |
| Ex. 4 | 50,585 | 15,508 | 3,864 | 830 | 60.9 | 1.2 |
| Ex. 5 | 51,410 | 15,676 | 3,898 | 836 | 61.5 | 1.2 |
| CE 1 | 36,053 | 13,262 | 3,680 | 855 | 42.2 | 1.6 |
| CE 2 | 44,635 | 14,203 | 3,672 | 816 | 54.7 | 1.2 |
| CE 3 | 21,127 | 8,089 | 2,470 | 639 | 33.0 | 1.6 |
| CE 4 | 20,309 | 8,480 | 2,566 | 635 | 32.0 | 2.0 |
| CE 5 | 27,013 | 11,419 | 3,492 | 858 | 31.5 | 2.0 |
| CE 6 | 28,266 | 12,057 | 3,723 | 913 | 31.0 | 2.1 |
| CE 7 | 40,705 | 14,261 | 3,849 | 863 | 47.2 | 1.5 |
| CE 8 | 24,204 | 10,186 | 3,178 | 811 | 29.8 | 2.0 |
| CE 9 | 19,811 | 8,715 | 2,835 | 736 | 26.9 | 2.1 |
| CE 10 | 19,105 | 8,424 | 2,742 | 713 | 26.8 | 2.1 |
| CE 11 | 40,473 | 13,554 | 3,600 | 823 | 49.2 | 1.3 |
| CE 12 | 37,944 | 12,276 | 3,206 | 730 | 52.0 | 1.3 |
| CE 13 | 37,164 | 14,111 | 4,034 | 939 | 39.6 | 1.7 |
| CE 14 | 16,593 | 7,709 | 2,542 | 663 | 25.0 | 2.4 |
| CE 15 | 47,127 | 15,488 | 4,024 | 881 | 53.5 | 1.3 |
| CE 16 | 22,066 | 9,470 | 2,985 | 751 | 29.4 | 2.1 |
| CE 17 | 11,627 | 6,437 | 2,377 | 666 | 17.5 | 3.8 |
| CE 18 | 17,063 | 7,810 | 2,546 | 667 | 25.6 | 2.3 |
| CE 19 | 34,788 | 12,138 | 3,289 | 758 | 45.9 | 1.4 |
| CE 20 | 10,755 | 6,638 | 2,652 | 786 | 13.7 | 4.8 |
| CE 21 | 53,524 | 17,221 | 4,406 | 953 | 56.2 | 1.3 |

TABLE 8-continued

Viscosities in Pa·s at 0.1, 1, 10, and 100 rad/s, the viscosity ratio, and the tan delta at 190° C.

| Sample | Visc 0.1 rad/s | Visc 1 rad/s | Visc 10 rad/s | Visc 100 rad/s | Vis. Ratio V0.1/V100 | Tan Delta 0.1 rad/s |
|---|---|---|---|---|---|---|
| CE 22 | 28,178 | 10,815 | 3,125 | 741 | 38.0 | 1.7 |
| CE 23 | 36,174 | 13,602 | 3,899 | 914 | 39.6 | 1.6 |
| CE 24 | 16,153 | 8,048 | 2,803 | 751 | 21.5 | 2.9 |
| CE 25 | 19,388 | 8,702 | 2,860 | 749 | 25.9 | 0.7 |
| CE 26 | 6,250 | 3,236 | 1,244 | 384 | 16.3 | 2.9 |

TABLE 9

Branching results in branches per 1000 C by $^{13}$C NMR of Examples and Comparative Examples.

| Sample | C1 | 1,3 diethyl branches | C2 on Quat Carbon | C4 | C5 | C6+ |
|---|---|---|---|---|---|---|
| Ex. 1 | 1.50 | 3.80 | 1.30 | 6.50 | 2.10 | 2.90 |
| Ex. 2 | 1.83 | 3.76 | 1.22 | 6.76 | 1.78 | 2.75 |
| Ex. 3 | 2.06 | 4.09 | 1.26 | 6.86 | 1.62 | 2.37 |
| Ex. 4 | 2.09 | 4.23 | 1.29 | 6.80 | 1.58 | 2.11 |
| Ex. 5 | 2.18 | 3.97 | 1.20 | 6.91 | 1.60 | 2.35 |
| CE 1 | 2.50 | 3.10 | 0.80 | 5.80 | 2.10 | 3.10 |
| CE 27*** | ND | ND | ND | ND | ND | 19.5* |
| CE 28**** | ND | ND | ND | ND | ND | 11.4* |

*The values in the C6 column for the DOWLEX and AFFINITY samples represent C6 branches from octene only, and do not include chain ends.
**ND = not detected..
***AFFINITY PL 1880.
****DOWLEX 2045G

TABLE 10

Unsaturation results by $^1$H NMR of Examples and Comparative Examples.

| Sample | vinyl/ 1000 C | cis and trans/ 1000 C | trisub/ 1000 C | vinylidene/ 1000 C | total unsaturation/ 1000 C |
|---|---|---|---|---|---|
| Ex. 1 | 0.124 | 0.044 | 0.075 | 0.164 | 0.41 |
| Ex. 2 | 0.132 | 0.042 | 0.051 | 0.195 | 0.42 |
| Ex. 3 | 0.148 | 0.049 | 0.085 | 0.205 | 0.49 |
| Ex. 4 | 0.153 | 0.052 | 0.095 | 0.210 | 0.51 |
| Ex. 5 | 0.164 | 0.060 | 0.128 | 0.214 | 0.57 |
| CE 1 | 0.147 | 0.057 | 0.061 | 0.089 | 0.35 |
| CE 27*** | 0.040 | 0.064 | 0.123 | 0.043 | 0.27 |
| CE 28**** | 0.283 | 0.049 | 0.042 | 0.055 | 0.43 |

***AFFINITY PL 1880
****DOWLEX 2045G

TABLE 11

DSC results of Examples and Comparative Examples.

| Sample | $T_m$ (° C.) | Heat of Fusion (J/g) | % Crystallinity | $T_c$ (° C.) |
|---|---|---|---|---|
| Ex. 1 | 110.5 | 141.8 | 48.6 | 97.8 |
| Ex. 2 | 108.7 | 146.4 | 50.1 | 96.0 |
| Ex. 3 | 108.5 | 147.9 | 50.7 | 96.1 |
| Ex. 4 | 108.5 | 147.0 | 50.3 | 96.2 |
| Ex. 5 | 108.8 | 148.4 | 50.8 | 96.2 |

Formulations

Blown films were made, and physical properties measured, with different LDPEs and one LLDPE (LLDPE1 (DOWLEX 2045G)). LLDPE1 had a "1.0 melt index (MI or I2), and a 0.920 g/cc density." Films were made at 20 wt % and 80 wt % of the respective LDPE, based on the weight of the LDPE and LLDPE1.

Each formulation was compounded on a MAGUIRE gravimetric blender. A polymer processing aid (PPA), DYNAMAR FX-5920A, was added to each formulation. The PPA was added at "1.125 wt % of masterbatch," based on the total weight of the weight of the formulation. The PPA masterbatch (Ingenia AC-01-01, available from Ingenia Polymers) contained 8 wt % of DYNAMAR FX-5920A in a polyethylene carrier. This amounts to 900 ppm PPA in the polymer.

LLDPE1 was also used as the LLDPE in the films made at maximum output. All samples were made with 80 wt % DOWLEX 2045G and 20 wt % LDPE.

Production of Blown Films

The monolayer blown films were made on an "8 inch die" with a polyethylene "Davis Standard Bather II screw." External cooling by an air ring and internal bubble cooling were used. General blown film parameters, used to produce each blown film, are shown in Table 12. The temperatures are the temperatures closest to the pellet hopper (Barrel 1), and in increasing order, as the polymer was extruded through the die.

TABLE 12

Blown film fabrication conditions for films.

| % LDPE | 20 | 80 |
|---|---|---|
| Blow up ratio (BUR) | 2.5 | 2.5 |
| Film thickness | 2.0 | 2.0 |
| Die gap (mil) | 70 | 70 |
| Air temperature (° F.) | 45 | 45 |
| Temperature profile (° F.) | | |
| Barrel 1 | 350 | 375 |
| Barrel 2 | 415 | 465 |
| Barrel 3 | 365 | 440 |
| Barrel 4 | 305 | 425 |
| Barrel 5 | 305 | 425 |
| Screen Temperature | 410 | 460 |
| Adapter | 410 | 460 |
| Block | 430 | 460 |
| Lower Die | 440 | 460 |
| Inner Die | 440 | 460 |
| Upper Die | 440 | 460 |

Production of Films for Determination of Maximum Output Rate of Blown Film

Film samples were made at a controlled rate and at a maximum rate. The controlled rate was 250 lb/hr, which equals an output rate of 10.0 lb/hr/inch of die circumference. The die diameter used for the maximum output trials was an 8 inch die, so that for the controlled rate, as an example, the conversion between "lb/hr" and "lb/hr/inch" of die circumference, is shown in Equation 16. Similarly, such an equation can be used for other rates, such as the maximum rate, by substituting the maximum rate in Equation 16 to determine the "lb/hr/inch" of die circumference.

$$\text{Lb/Hr/Inch of Die Circumference} = (250 \text{ Lb/Hr})/(8*\pi) = 10 \quad \text{(Eq. 16)}$$

The maximum rate for a given sample was determined by increasing the output rate to the point where bubble stability was the limiting factor. The extruder profile was maintained for both samples (standard rate and maximum rate), however the melt temperature was higher for the maximum rate samples, due to the increased shear rate with higher motor speed (rpm, revolutions per minute). The maximum bubble stability was determined by taking the bubble to the point where it would not stay seated in the air ring. At that point, the rate was reduced to where the bubble was reseated in the air ring, and then a sample was collected. The cooling on the bubble was adjusted by adjusting the air ring and maintaining the bubble. This was taken as the maximum output rate, while maintaining bubble stability.

Film and extrusion coating drawdown properties are listed in Tables 13-14. As seen in Table 13, it has been discovered that the Inventive Examples have excellent optics of haze, gloss, and clarity, compared to the highest melt strength blend (Film #1) and (Film #5) at standard and maximum output rates. All "Inventive Example blend films" have similar toughness in terms of tear, dart, and puncture, compared to the Comparative Example blends, at standard and maximum rates, which is important, as it is desired to maintain toughness, while enhancing output. The Inventive Examples Film #6 and Film #7 have improved maximum output over Film #8.

As seen in Table 14, it has been discovered that the Inventive Examples used in Films #10 and #11 have excellent optics of haze, gloss, and clarity compared to the highest melt strength (Film #9) at standard output rates. All "Inventive Example blend films" have similar or improved toughness, in terms of tear and puncture, compared to the highest melt strength (Film #9), at standard rates, which is important, as it is desired to maintain toughness, while enhancing output. In addition, the Inventive Films #10 and #11 have significantly improved (greater than 15%) dart compared to all the other film blends.

TABLE 13

Film properties of 80% LLDPE1/20% LDPE Films #1-8 made at 2 mil at a standard (std.) rate of 250 lb/hr and at a maximum (max.) rate (8" die).

| | Film | | | | | | | |
|---|---|---|---|---|---|---|---|---|
| | 1 | 2 | 3 | 4 | 5 | 6 | 7 | 8 |
| Component 1 | LLDPE1 | LLDPE1 | LLDPE1 | LLDPE1 | LLDPE1 | LLDPE1 | LLDPE1 | LLDPE1 |
| Wt % Component 1 | 80 | 80 | 80 | 80 | 80 | 80 | 80 | 80 |
| Component 2 | CE 3 | Ex. 1 | Ex. 3 | CE 7 | CE 3 | Ex. 1 | Ex. 3 | CE 7 |
| Wt % Component 2 | 20 | 20 | 20 | 20 | 20 | 20 | 20 | 20 |
| Blown Film Rate | Std. | Std. | Std. | Std. | Max. | Max. | Max. | Max. |
| Haze (%) | 19.5 | 8.5 | 10.2 | 8.3 | 17.9 | 9.1 | 9.7 | 8.6 |
| Haze, Internal (%) | 2.7 | 2.6 | 2.7 | 2.6 | 2.8 | 2.6 | 2.7 | 3.1 |
| 45 Degree Gloss (%) | 33.7 | 63.7 | 58.1 | 66.6 | 37.7 | 62.4 | 59.8 | 65.8 |
| Clarity (%) | 75.6 | 96.2 | 93.3 | 97.3 | 79.2 | 97.1 | 94.3 | 97.6 |
| MD Tear (g) | 423 | 376 | 333 | 368 | 365 | 449 | 333 | 436 |
| CD Tear (g) | 1,254 | 1,452 | 1,320 | 1,467 | 1,315 | 1,460 | 1,437 | 1,456 |
| Normalized MD Tear (g/mil) | 210 | 182 | 165 | 183 | 176 | 223 | 165 | 220 |
| Normalized CD Tear (g/mil) | 617 | 710 | 669 | 750 | 640 | 725 | 705 | 746 |
| Dart A (g) | 253 | 295 | 286 | 286 | 235 | 286 | 268 | 295 |
| Puncture (ft-lb/in$^3$) | 198 | 222 | 224 | 223 | 206 | 214 | 220 | 225 |
| 2% MD Secant Modulus (psi) | 29,964 | 29,083 | 30,781 | 29,656 | 30,341 | 31,024 | 31,193 | 29,102 |
| 2% CD Secant Modulus (psi) | 37,613 | 33,215 | 37,856 | 34,758 | 37,507 | 35,791 | 36,828 | 33,776 |
| MD Shrink Tension (psi) | 14.5 | 10.8 | 14.8 | 10.5 | 16.8 | 12.0 | 14.3 | 10.9 |
| CD Shrink Tension (psi) | 0.2 | 0.5 | 0.4 | 0.3 | 0.4 | 0.3 | 0.3 | 0.2 |
| Thickness (mil) | 2.06 | 2.06 | 1.98 | 1.93 | 2.05 | 2.02 | 1.96 | 1.91 |
| Frost Line Height (inches) | 33 | 33 | 33 | 33 | 74 | 69 | 67 | 56 |
| Melt Temperature (° F.) | 406 | 405 | 406 | 404 | 448 | 433 | 437 | 430 |
| Rate Output (lb/hr) | 249 | 251 | 253 | 253 | 491 | 415 | 422 | 405 |
| Rate Output (lb/hr/in) | 9.9 | 10.0 | 10.1 | 10.1 | 19.5 | 16.5 | 16.8 | 16.1 |

TABLE 14

Film properties of 20% LLDPE1/80% LDPE Films #9-13 made at 2 mil at a standard (std.) rate of 250 lb/hr (8" die).

| Film | 9 | 10 | 11 | 12 | 13 |
|---|---|---|---|---|---|
| Component 1 | LLDPE1 | LLDPE1 | LLDPE1 | LLDPE1 | LLDPE1 |
| Wt % Component 1 | 20 | 20 | 20 | 20 | 20 |
| Component 2 | CE 3 | Ex. 1 | Ex. 3 | CE 7 | CE 5 |

TABLE 14-continued

Film properties of 20% LLDPE1/80% LDPE Films #9-13 made at 2 mil at a standard (std.) rate of 250 lb/hr (8" die).

| Film | 9 | 10 | 11 | 12 | 13 |
|---|---|---|---|---|---|
| Wt % Component 2 | 80 | 80 | 80 | 80 | 80 |
| Haze (%) | 40.0 | 13.8 | 16.5 | 10.7 | 9.9 |
| Haze, Internal (%) | 1.8 | 1.7 | 3.3 | 1.9 | 5.1 |
| 45 Degree Gloss (%) | 14.5 | 43.8 | 39.2 | 52.5 | 65.8 |
| Clarity (%) | 41.5 | 83.7 | 79.3 | 88.6 | 94.9 |
| MD Tear (g) | 158 | 207 | 189 | 240 | 251 |
| CD Tear (g) | 329 | 420 | 409 | 410 | 611 |
| Normalized MD Tear (g/mil) | 74 | 98 | 88 | 114 | 125 |
| Normalized CD Tear (g/mil) | 154 | 196 | 188 | 200 | 303 |
| Dart A (g) | 184 | 217 | 220 | 160 | 133 |
| Puncture (ft-lb/in$^3$) | 72 | 108 | 97 | 91 | 87 |
| 2% MD Secant Modulus (psi) | 30,240 | 31,574 | 30,228 | 30,152 | 33,134 |
| 2% CD Secant Modulus (psi) | 34,452 | 37,313 | 35,418 | 35,261 | 37,587 |
| MD Shrink Tension (psi) | 38.1 | 30.9 | 34.3 | 28.2 | 20.5 |
| CD Shrink Tension (psi) | 0.4 | 0.7 | 0.5 | 0.6 | 0.7 |
| Thickness (mil) | 2.11 | 2.13 | 2.17 | 2.07 | 2.01 |
| Frost Line Height (inches) | 30 | 30 | 30 | 30 | 31 |
| Melt Temperature (° F.) | 453 | 468 | 467 | 465 | 463 |
| Rate Output (lb/hr) | 250 | 249 | 249 | 254 | 251 |
| Rate Output (lb/hr/in) | 9.9 | 9.9 | 9.9 | 10.1 | 10.0 |

The invention claimed is:

1. A composition comprising an ethylene-based polymer that comprises the following features:
    a) at least 0.1 amyl groups per 1000 total carbon atoms;
    b) a melt index of 0.01 to 0.3;
    c) a z-average molecular weight of Mz (conv) of greater than 350,000 g/mol and less than 425,000 g/mol;
    d) a gpcBR value from 1.50 to 2.05, and
    e) a MWD(conv) [Mw(conv)/Mn(conv)] from 6 to 9.

2. The composition of claim 1, wherein the ethylene-based polymer has a GPC-Light Scattering parameter "LSP" less than 2.0.

3. The composition of-claim 1, wherein the polymer has a melt strength greater than 15cN and less than 25 cN.

4. The composition of claim 1, wherein the polymer has a MWD(conv) from 5 to 8.

5. The composition of claim 1, wherein the polymer has a melt index (I2) from 0.01 to 1 g/10 min.

6. The composition of claim 1, wherein the polymer has a density from 0.910 to 0.940 g/cc.

7. The composition of claim 1, wherein the polymer has a melt strength of at least 15 cN and less than 21 cN, and a velocity at break of greater than 40 mm/s.

8. The composition of claim 1, wherein the polymer has a viscosity ratio (V0.1/V100, at 190° C.) greater than 50.

9. The composition of claim 1, wherein the polymer has a MWD(conv) greater than 6.

10. The composition of claim 1, wherein the polymer is a low density polyethylene (LDPE), obtained by the high pressure, free radical polymerization of ethylene.

11. An article comprising at least one component formed from the composition of claim 1.

12. The article of claim 11, wherein the article is a film.

* * * * *